(12) United States Patent
Sugimoto et al.

(10) Patent No.: US 7,525,601 B2
(45) Date of Patent: Apr. 28, 2009

(54) IMAGE SWITCHING APPARATUS, IMAGE SWITCHING METHOD, AND PROGRAM RECORDING MEDIUM

(75) Inventors: Hiroyuki Sugimoto, Kanagawa (JP); Sensaburo Nakamura, Shizuoka (JP); Nobuyuki Minami, Kanagawa (JP)

(73) Assignee: Sony Corporation, Tokyo (JP)

( * ) Notice: Subject to any disclaimer, the term of this patent is extended or adjusted under 35 U.S.C. 154(b) by 568 days.

(21) Appl. No.: 11/218,638

(22) Filed: Sep. 6, 2005

(65) Prior Publication Data

US 2006/0050180 A1    Mar. 9, 2006

(30) Foreign Application Priority Data

Sep. 9, 2004   (JP)   ............................ P2004-262852

(51) Int. Cl.
   *H04N 9/74*    (2006.01)
(52) U.S. Cl. ........................ 348/578; 348/584; 348/722; 386/52; 715/723
(58) Field of Classification Search ................. 348/584, 348/722, 705, 706, 578; 386/52, 53, 55; 715/723
   See application file for complete search history.

(56) References Cited

U.S. PATENT DOCUMENTS

| 5,262,865 | A  | * | 11/1993 | Herz ............................ 348/705 |
| 6,518,978 | B1 | * | 2/2003  | Omata et al. ................. 715/723 |
| 7,020,381 | B1 | * | 3/2006  | Kato et al. .................... 386/52 |
| 2005/0041159 | A1 | * | 2/2005 | Nakamura et al. .......... 348/722 |

FOREIGN PATENT DOCUMENTS

| JP | 2004-153486 | 5/2004 |
| JP | 2004-173074 | 6/2004 |

* cited by examiner

*Primary Examiner*—M. Lee
(74) *Attorney, Agent, or Firm*—Oblon, Spivak, McClelland, Maier & Neustadt, P.C.

(57) ABSTRACT

The present invention provides an image switching apparatus allowing a operator to easily operate a plurality of special effect apparatuses through different interfaces by using a common operation. The image switching apparatus includes a first image output interface, a first image input interface, a second image output interface, a second image input interface, a type storage section, a routing instruction section, one or more image synthesis/switching section, a synthesis/switching operation input section, and an assignment management section which refers to the type storage section in response to an instruction from the routing instruction section and outputs the image in the image synthesis/switching section to the first image output interface as well as acquires the image from the first image input interface to input the acquired image to the image synthesis/switching section when the setting is the first path, whereas outputs the image in the image synthesis/switching section to the second image output interface as well as acquires the image from the second image input interface to input the acquired image to the image synthesis/switching section when the setting is the second path, and refers to the type storage section in response to an input image selection instruction from the synthesis/switching operation input section and selects an image to be directed to the first image output interface when the setting is the first path, whereas selects an image to be directed to the second image output interface when the setting is the second path.

13 Claims, 21 Drawing Sheets

90

| | 91 | 92 | 93 | 94 |
|---|---|---|---|---|
| | Number | I/F | Auxiliary output bus number | Input line number |
| | 1 | SDI | 7, 8 | 17, 18 |
| | 2 | SDI | 9, 10 | 19, 20 |
| | 3 | Parallel | — | — |
| | 4 | Parallel | — | — |
| 95 → | C | SDI | A(18) | P(19) |
| 96 → | C | Parallel | — | — |

US 7,525,601 B2

IMAGE SWITCHING APPARATUS, IMAGE SWITCHING METHOD, AND PROGRAM RECORDING MEDIUM

CROSS REFERENCE TO RELATED APPLICATIONS

The present invention contains subject matter related to Japanese Patent Application JP 2004-262852 filed in Japanese Patent Office on Sep. 9, 2004, the entire contents of which being incorporated herein by reference.

BACKGROUND OF THE INVENTION

1. Field of the Invention

The present invention relates to an image switching apparatus and an image switching method capable of performing switching and synthesis processing involving special effect processing, such as enlarge and reduce, for a plurality of input image signals, and a program recording medium.

2. Description of the Related Art

On broadcasting stations, or in the filed of video editing, or the like, so-called a switcher apparatus which performs switching, synthesis, and the like for a plurality of input video images from a video player or the like so as to output the resultant images has been widely used. Further, in recent years, the opportunity that switching and synthesis processing for video images, which is obtained by applying various special effects such as enlarge, reduce, and rotate, to input images through digital processing, is performed before output has been increased. Accordingly, a special effect apparatus that applies special effects to input image is more and more frequently used together with the switcher apparatus.

Hereinafter, an example of an image switching apparatus that uses the switcher apparatus and special effect apparatus to apply special effects to video images for output will be described. FIG. 1 schematically shows the configuration of a conventional image switching apparatus that the applicant of the present invention has filed previously (Patent Document 1: Jpn. Pat. Appln. Laid-Open Publication No. 2002-320140).

An image switching apparatus 300 shown in FIG. 1 includes: an image synthesis/switching section 310 serving as a switcher apparatus that performs switching of outputs and synthesis processing for a plurality of input image signals; a special effect processing section 320 which applies various special effects to the image signals from the image synthesis/switching section 310; a switching operation input section 330 for an operator to perform an input operation for the output switching and synthesis processing of the image synthesis/switching section 310; and a special effect operation input section 340 for the operator to perform the special effect processing of the special effect processing section 320. A combination of the image synthesis/switching section 310 and special effect processing section 320 allows the switching of output images and synthesis processing involving special effect processing to be realized in the image switching apparatus 300.

The image synthesis/switching section 310 includes: an input selection section 311 which selects a plurality of input image signals so as to connect to a plurality of output channels; a synthesis processing section 312 which applies various synthesis processing to image signals output from the input selection section 311; and a synthesis/switching controller 313 which controls the operations of the input selection section 311 and synthesis processing section 312. The input selection section 311 has a selection switch matrix 316 which allows respective input lines 314a to 314i to which a plurality of image signals are input from an external device to be connected to any of a plurality of input buses 315a to 315c connected to the synthesis processing section 312. With this configuration, a plurality of image signals output from an external device are selected and input to the synthesis processing section 312. The selection operation for the input images performed by the selection switch matrix 316 is controlled by the synthesis/switching controller 313. The number of the input lines 314a to 314i and that of the input buses 315a to 315c are not limited to the above.

The synthesis processing section 312 applies various image switching and synthesis processing to the image signals from the plurality of input buses 315a to 315c so as to output the image signals. Examples of the processing that the synthesis processing section 312 can perform include, in addition to standard image synthesis output processing, so-called keying, which is a technique used to superimpose one image on another, processing using so-called a wipe function (hereinafter, referred to wipe processing), which is a technique of switching images while moving the boundary between a base image and new image from one side to another, and the like. Further, the synthesis processing section 312 has a function of outputting arbitrary image signals among those on the plurality of input buses 315a to 315c to the special effect processing section 320. After the special effect processing section 320 applies various special effects to the image signals and outputs the resultant image signals to the synthesis processing section 312, the synthesis processing section 312 can perform the image switching and synthesis processing using the resultant image signals.

The synthesis processing section 312 performs predetermined image switching processing and synthesis processing according to, for example, a processing pattern set in advance. The processing pattern designates the type of the processing operation to be performed in the synthesis processing section 312. The type of the processing operation includes, for example, image switching using keying technique, image switching using wipe processing, and image switching by changing the ratio between images to be synthesized. Further, the processing pattern includes information designating the time-series transition of the processing operation. More specifically, this information designates how the boundary or ratio between an original image and new image to be synthesized is changed with time in image switching. The degree of the progress of the processing operation designated by the processing pattern is given as a progress ratio, where the initial state when the processing pattern is designated is set as 0% and the completion state of the processing operation after progress of the image switching and synthesis processing according to the designated processing pattern is set as 100%. In the synthesis processing section 312, the processing operation proceeds while the processing pattern or progress ratio is controlled by the synthesis/switching controller 313.

The synthesis/switching controller 313 controls the processing operations of the input selection section 311 and synthesis processing section 312 based on a control signal output from the switching operation input section 330. For example, the synthesis/switching controller 313 receives, from the switching operation input section 330, a control signal including pattern designation information that designates a processing pattern in the synthesis processing section 312, progress ratio designation information that designates a progress ratio of the processing operation corresponding to the designated processing pattern, and selection designation information that gives instruction on the input image selection switching operation in the selection switch matrix 316 and designates the processing operations in the input selection section 311 and synthesis processing section 312 to thereby control them.

The switching operation input section 330 has switches for designating the processing pattern and progress ratio in the synthesis processing section 312 and for giving instruction on the selection switching operation for input images in the input selection section 311 and the like. An operator's operation for the switches generates the pattern designation information, progress ratio designation information, and selection instruction information and sends them to the synthesis/switching controller 312. For example, the operator operates numerical keys, button switches or the like to designate the number of the processing pattern in the synthesis processing section 312 or the numbers of input lines 314a to 314i and input buses 315a to 315c to be connected to each other in the input selection section 311, or the operator operates fader switches to designate the progress ratio in the synthesis processing section 312. Further, the switching operation input section 330 can set the content of the processing pattern in the synthesis processing section 312 through the operator's operation for the switches.

The special effect processing section 320 has a function of applying, to the image output from the synthesis processing section 312, various special effect processing involving a digital computation such as enlarge, reduce, rotation, shift of display position, deform, change of color tone, emphasis on brightness change, and the like. In the special effect processing section 320, as in the case of the synthesis processing section 312, a processing pattern in which information on the type of the special effect and the transition of its operation has been previously set is designated by the special effect operation input section 340. Similarly, the progress ratio of the processing operation corresponding to the processing pattern is also controlled by the special effect operation input section 340.

The special effect operation input section 340 has switches for designating the processing pattern and its progress ratio in the special effect processing section 320. An operator's operation for the switches allows a control signal including the pattern designation information that designates the processing pattern for the special effect processing section 320 and progress ratio designation information that designates the progress ratio to be sent to the special effect processing section 320. As in the case of the switching operation input section 330, the operator operates, for example, numerical keys, button switches or the like to designate the number of the processing operation to be performed, or the operator operates fader switches to designate the progress ratio. Further, the special effect operation input section 340 can set the content of the processing pattern in the special effect processing section 320 through the operator's operation for the switches.

As described above, in the image switching apparatus 300, the operator's operation for the switching operation input section 330 and special effect operation input section 340 allows respective processing operations in the image synthesis/switching section 310 and special effect processing section 320 to be performed, thereby enabling the special effect processing section 320 to perform the display switching and synthesis processing involving special effects, such as keying or wipe processing.

When the processing pattern in the special effect processing section 320 is made corresponding to the processing pattern that designates the processing operation in the synthesis processing section 312 of the image synthesis/switching section 310, and the processing operation in the special effect processing section 320 is allowed to proceed according to the same progress ratio as that of the image synthesis/switching section 310, it is possible to allow the processing operation in the special effect processing section 320 to operate simultaneously with the processing operation in the synthesis processing section 312. In this case, common control information to both the image synthesis/switching section 310 and special effect processing section 320 is supplied from the switching operation input section 330 to the synthesis/switching controller 313, and the pattern designation information and progress ratio designation information is supplied to the special effect processing section 320 through the synthesis/switching controller 313. That is, it is possible for the operator to perform an operation control for the special effect processing section 320 and synthesis processing section 312 only through the switching operation input section 330.

In a conventional system having the configuration as shown in FIG. 1, the special effect processing section 320 is directly connected to the synthesis processing section 312, so that the special effect processing section 320 needs to be provided with a dedicated interface and a dedicated control method. This configuration increases operability and convenience; on the other hand, it is necessary to adopt and install the same manufacturer's special effect processing section 320 exclusively for the image switching apparatus 300.

Further, an image switching system, shown in FIG. 2, that uses a versatile special effect apparatus has also been widely used. In the image switching system shown in FIG. 2, an image switching apparatus 350 is constituted by an image synthesis/switching section 360 and switching operation input section 380. The image switching apparatus 350 is connected to an external special effect apparatus 370 through an SDI transmission path. The external special effect apparatus 370 is connected to a special effect operation input section 390 for the operator to perform an input operation for the special effect processing. In this system, the image switching apparatus 350 exchanges images with the external special effect apparatus 370 through the SDI transmission path. For this operation, the image switching apparatus 350 has an auxiliary output selection bus 366 for selectively outputting an auxiliary output to the external special effect apparatus 370.

In the above image switching system, the image switching apparatus 350 combines the image synthesis/switching section 360 and external special effect apparatus 370 to thereby realize switching of output images or synthesis processing involving special effect processing.

The image synthesis/switching section 360 includes an input selection section 361, a synthesis processing section 362 which applies various synthesis processing to an output image signal from the input selection section 361 so as to output the resultant image signal, and a synthesis/switching controller 363 which controls the operations of the input selection section 361 and synthesis processing section 362. The input selection section 361 has a matrix of selection switch matrix 366 which allows respective input lines 364a to 364i to which a plurality of image signals are input from an external device to be connected to any of a plurality of input buses 365a to 365c connected to the synthesis processing section 362. With this configuration, a plurality of image signals output from an external device are selected and input to the synthesis processing section 362. The selection operation for the input images performed by the selection switch matrix 366 is controlled by the synthesis/switching controller 363. The number of the input lines 364a to 364i and that of the input buses 365a to 365c are not limited to the above.

The selected image is output from the auxiliary output line (Aux output) provided in the image switching apparatus 350 through the auxiliary output selection bus 366. The output image is then input to the special effect apparatus 370 followed by processing for the image. The processed image is returned (as an output to which special effect processing has been applied) to one of the inputs of the image switching apparatus 350.

In the configuration as described above, the special effect apparatus 370 need not always be a product of the same manufacturer as the image switching apparatus 350. Further, in this configuration, the expensive special effect apparatus 370 can be connected to various types of image switching apparatuses installed at various locations, according to need.

The image switching apparatus 350 is used in order to, for example, switch images of a live TV broadcast, and is, therefore, required to have high operability so that an operator can select a desired image without fail. Further, in recent years, application of various special effects to images for broadcasting has been needed.

SUMMARY OF THE INVENTION

In the image switching system shown in FIG. 2, the special effect apparatus 370 has high flexibility in terms of installation location and is more advantageous from an economical standpoint than the case where the special effect apparatus is installed as a dedicated apparatus for one image switching apparatus 350.

However, when the operator performs selection of the image to be subjected to special effects, he or she needs to operate an extra operation for the auxiliary output selection bus 366, in addition to an operation for the image synthesis/switching section 360. It can thus be said that the operability is worse than the image switching apparatus having the configuration shown in FIG. 1.

In the case where the external special effect apparatus 370 is added to the configuration of FIG. 1 with use of the system shown in FIG. 2, the operation method between the case of using the incorporated special effect processing section 320 and that of using the newly added special effect processing section 370 is entirely different from each other, resulting in poor operability.

Further, in the case where a plurality of special effect apparatuses are operated (from a plurality of image synthesis/switching sections), when different types of the special effect apparatuses exist, the operation method may differ for each apparatus resulting in poor operability.

The present invention has been made in view of the above situations, and it is desirable to provide an image switching apparatus allowing an operator to easily operate a plurality of special effect apparatuses, which are connected to the image switching apparatus through different interfaces, by using a common operation method.

According to the present invention, there is provided an image switching apparatus which uses two types or more of special effect apparatuses having different I/O interfaces from each other to apply special effect processing to a plurality of input images and further uses an image synthesis means to perform switching processing involving image synthesis processing, comprising: a first image output interface for a first special effect apparatus to be connected to the image synthesis means; a first image input interface for the first special effect apparatus; a second image output interface for a second special effect apparatus to be connected to the image synthesis means; a second image input interface for the second special effect apparatus; a type storage section which stores settings indicating whether to use either a first path which is based on a combination of the first image output interface and first image input interface or a second path which is based on a combination of the second image output interface and second image input interface; a routing instruction means for inputting an instruction that causes an image to go through the special effect apparatus; one or more image synthesis/switching sections including selection switches for an operator to perform switching processing between the image selected from a plurality of externally input images and the first or second image input interface and the image synthesis means which performs synthesis processing; a synthesis/switching operation input section for the operator to perform input operation to select the image to be input to the image synthesis/switching section; and an assignment management section which refers to the type storage section in response to an instruction from the "routing through special effect apparatus" instruction means and outputs the image in the image synthesis/switching section to the first image output interface as well as acquires the image from the first image input interface to input the acquired image to the image synthesis/switching section when the setting is the first path, whereas outputs the image in the image synthesis/switching section to the second image output interface as well as acquires the image from the second image input interface to input the acquired image to the image synthesis/switching section when the setting is the second path, and refers to the type storage section in response to an input image selection instruction from the synthesis/switching operation input section and selects an image to be directed to the first image output interface when the setting is the first path, whereas selects an image to be directed to the second image output interface when the setting is the second path.

According to the present invention, there is provided an image switching method which uses two types or more of special effect apparatuses having different I/O interfaces from each other to apply special effect processing to a plurality of input images and further uses an image synthesis step to apply switching processing involving image synthesis processing, in which the method further using a type storage section which stores settings indicating whether to use either a first path which is based on a combination of a first image output interface for a first special effect apparatus and first image input interface for the first special effect apparatus or a second path which is based on a combination of a second image output interface for a second special effect apparatus to be connected to the image synthesis step and second image input interface for the second special effect apparatus, the method comprising: a "routing through special effect apparatus" instruction step of inputting an instruction that causes an image to go through the special effect apparatus; an image synthesis/switching step including a selection switching step of performing switching processing for the image selected from a plurality of externally input images and the first or second image input interface and the image synthesis step that performs synthesis processing; a synthesis/switching operation input step of performing input operation to select the image to be input to the image synthesis/switching step; and an assignment management step of referring to the type storage section in response to an instruction from the "routing through special effect apparatus" instruction step and outputting the image in the image synthesis/switching step to the first image output interface as well as acquiring the image from the first image input interface to input the acquired image to the image synthesis/switching step when the setting is the first path, whereas outputting the image in the image synthesis/switching step to the second image output interface as well as acquiring the image from the second image input interface to input the acquired image to the image synthesis/switching step when the setting is the second path, and referring to the type storage section in response to an input image selection instruction from the synthesis/switching operation input step and selecting an image to be directed to the first image output interface when the setting is the first path, whereas selecting an image to be directed to the second image output interface when the setting is the second path.

According to the present invention, there is provided a program recording medium storing an image switching program which uses two types or more of special effect apparatuses having different I/O interfaces from each other to apply special effect processing to a plurality of input images and further uses an image synthesis step to apply switching processing involving image synthesis processing, in which the program further using a type storage section which stores settings indicating whether to use either a first path which is based on a combination of a first image output interface for a first special effect apparatus to be connected to the image synthesis means and first image input interface for the first special effect apparatus or a second path which is based on a combination of a second image output interface for a second special effect apparatus to be connected to the image synthesis step and second image input interface for the second special effect apparatus, the program comprising: a "routing through special effect apparatus" instruction step of inputting an instruction that causes an image to go through the special effect apparatus; an image synthesis/switching step including a selection switching step of performing switching processing for the image selected from a plurality of externally input images and the image from the first or second image input interface and the image synthesis step that performs synthesis processing; a synthesis/switching operation input step of performing input operation to select the image to be input to the image synthesis/switching step; and an assignment management step of referring to the type storage section in response to an instruction from the "routing through special effect apparatus" instruction step and outputting the image in the image synthesis/switching step to the first image output interface as well as acquiring the image from the first image input interface to input the acquired image to the image synthesis/switching step when the setting is the first path, whereas outputting the image in the image synthesis/switching step to the second image output interface as well as acquiring the image from the second image input interface to input the acquired image to the image synthesis/switching step when the setting is the second path, and referring to the type storage section in response to an input image selection instruction from the synthesis/switching operation input step and selecting an image to be directed to the first image output interface when the setting is the first path, whereas selecting an image to be directed to the second image output interface when the setting is the second path.

In the present invention, the type storage section is provided in the image switching apparatus to allow the image switching apparatus to determine which type of the two or more types of the special effect apparatuses is to be connected and used. By referring the type storage section in response to an instruction that causes an image to go through the special effect apparatus and thereby adequately controlling the path of the image, it is possible to utilize a plurality of types of special effect apparatuses with a simple and common operation, resulting in a good operability.

According to the present invention, there is provided an image switching apparatus which uses two types or more of special effect apparatuses having different interfaces, comprising: a type storage section which stores a plurality of types corresponding to the special effect apparatuses and the interfaces; a judging section for judging which special effect apparatus is connected and which interface is used; and an assignment management section which manages predetermined path based on the type, wherein the type is determined by referring to the type storage section according to the judging of the judge section.

For example, the image switching apparatus can use both a dedicated special effect apparatus and a versatile special effect apparatus. Thus, it is possible for the image switching apparatus to have a flexible configuration in accordance with time and place, resulting in improvement in cost efficiency.

When the processing does not requires the connection of the special effect apparatus, the path for connecting between the image switching apparatus and special effect apparatus can be used for another use. Thus, it is possible to perform flexible operation in accordance with time and place, resulting in improvement in cost efficiency.

DETAILED DESCRIPTION OF THE PREFERRED EMBODIMENTS

Hereinafter, preferred embodiments of the present invention will be described with reference to the accompanying drawings. Firstly, a first embodiment of the present invention will be described. The first embodiment is an image switching system 1 having an image switching apparatus which is a concrete example of the present invention.

Figure 3:
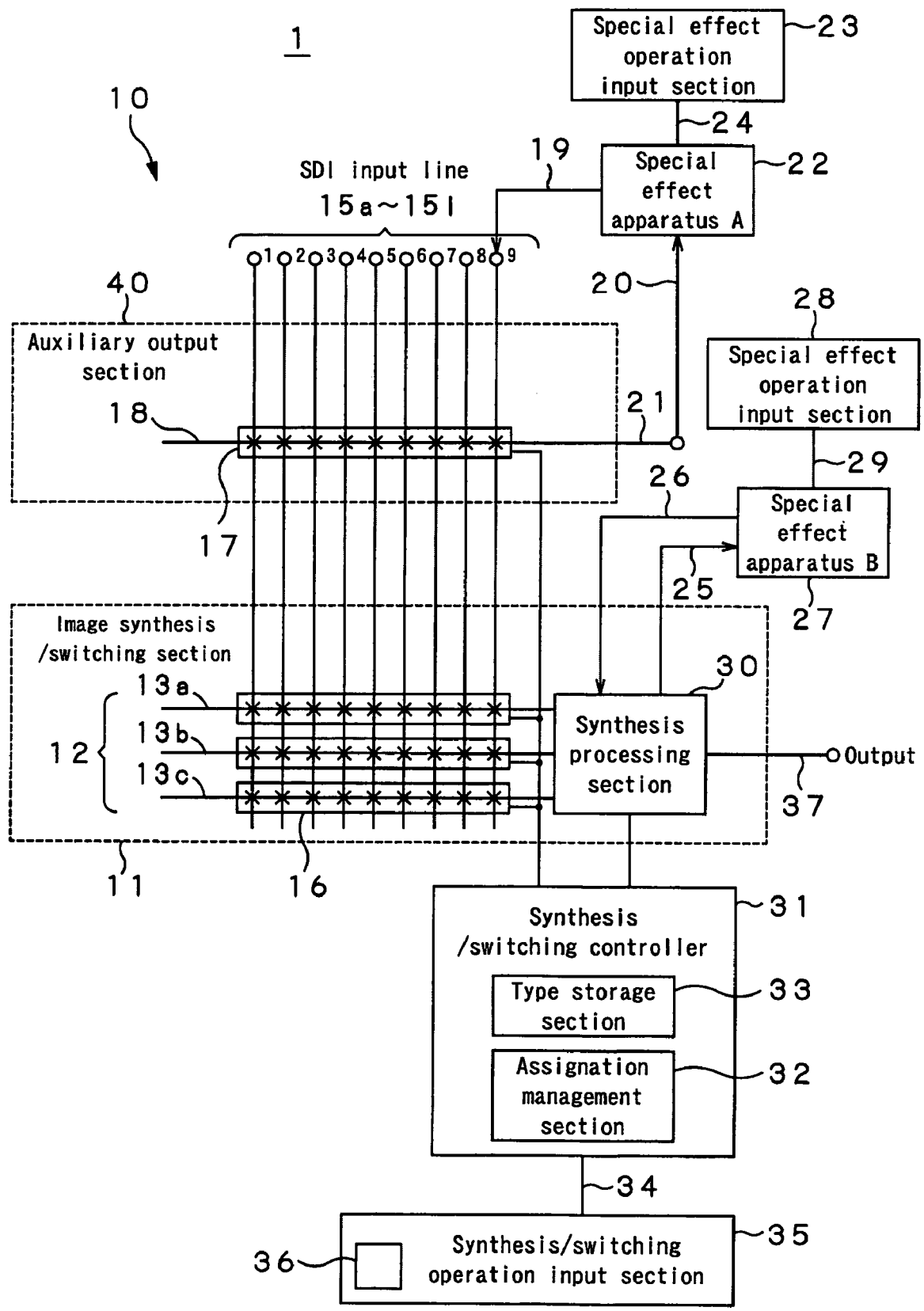
FIG. 3 is a view showing a configuration of an image switching system according to a first embodiment.

In an image switching system 1 shown in FIG. 3, an image switching apparatus 10 uses two types or more of special effect apparatuses having different I/O interfaces from each other to apply special effect processing to a plurality of input images and further uses an image synthesis means to apply switching processing involving image synthesis processing.

In order to realize the above function, the image switching apparatus 10 has: a first image output interface (SDI) 20 for a first special effect apparatus 22 to be connected to an image synthesis processing section 30 (to be described later); a first image input interface (SDI) 19 for the first special effect apparatus 22; a second image output interface 25 (interface exclusively for parallel port) for a second special effect apparatus 27 to be connected to the image synthesis processing section 30; a second image input interface 26 for the second special effect apparatus 27; a type storage section 33 which stores settings indicating whether to use either a first path which is based on a combination of the first image output interface and first image input interface or a second path which is based on a combination of the second image output interface and second image input interface; a "routing through special effect apparatus" instruction means 36 for an operator to input an instruction that causes an image to go through the special effect apparatus; one or more image synthesis/switching sections 11 including a selection switch matrix 16 for the operator to perform switching processing between the image selected from a plurality of externally input images and the image from the first or second image input interface and a synthesis processing section 30 which performs synthesis processing; a synthesis/switching operation input section 35 for the operator to perform input operation to select the image to be input to the image synthesis/switching section 11; and an assignment management section 32. The assignment management section 32 refers to the type storage section 33 in response to an instruction from the "routing through special effect apparatus" instruction means 36. When the first path is designated in the type storage section 33, the assignment management section 32 outputs the image in the image synthesis/switching section 11 to the first image output interface as well as acquires the image from the first image input interface and inputs the acquired image to the image synthesis/switching section 11; on the other hand, when the second path is designated, the assignment management section 32 outputs the image in the image synthesis/switching section 11 to the second image output interface as well as acquires the image from the second image input interface and inputs the acquired image to the image synthesis/switching section 11. Further, the assignment management section 32 refers to the type storage section 33 in response to an input image selection instruction from the synthesis/switching operation input section 35. When the first path is designated in the type storage section 33, the assignment management section 32 selects an image to be directed to the first image output interface; on the other hand, when the second path is designated, the assignment management section 32 selects an image to be directed to the second image output interface.

Details of the configuration of the image switching apparatus 10 will be described below. The image switching apparatus 10 is roughly constituted by the image synthesis/switching section 11 serving as a switcher apparatus which performs switching of output and synthesis processing for a plurality of input image signals, an auxiliary output section 40 which performs selection of an auxiliary output, a synthesis/switching controller 31 which controls the entire apparatus, and the synthesis/switching operation input section 35 for the operator to perform input operation for the output switching and synthesis processing in the image synthesis/switching section 11.

In the image switching system 1, the image switching apparatus 10 is connected to an external special effect apparatus to perform image switching and synthesis processing involving special effects. Hereinafter, a connection relation between the special effect apparatus and image switching apparatus 10 that constitute the image switching system 1 will be described.

The image switching apparatus 10 can use an external special effect apparatus 22 which receives an image from the auxiliary output section 40 through an SDI interface, applies various special effects to the image, and sends the resultant image to one of SDI input lines (line group) 15 through the SDI interface. The special effect operation input section 23 receives an operator's input operation for the special effect processing in the special effect apparatus 22. As an SDI special effect apparatus input, only a single path is shown in FIG. 3. Actually, however, a transmission path including a pair of V and K is provided in most cases.

Further, the image switching apparatus 10 can use a special effect apparatus 27 which receives an image from the image synthesis/switching section 11 through a dedicated parallel interface, applies various special effects to the image, and returns the resultant image to the image synthesis/switching section 11 through a parallel interface. The special effect operation input section 28 receives an operator's input operation for the special effect processing in the special effect apparatus 27.

The image synthesis/switching section 11 includes an input selection section 12 which selects a plurality of input image signals so as to connect to a plurality of output channels, and a synthesis processing section 30 which applies various synthesis processing to image signals output from the input selection section 12 and outputs the resultant output signal 37 to an output terminal (output).

The input selection section 12 has a matrix of selection switch matrix 16 which allows respective input lines 15a to 15i to which a plurality of image signals are input from an external device to be connected to any of a plurality of input buses 13a to 13c connected to the synthesis processing section 30. A plurality of image signals output from an external device are selected and input to the synthesis processing section 30 by the selection switch matrix 16.

The number of the input lines 15 and that of the input buses 13 are not limited to the above.

The synthesis processing section 30 applies various image switching and synthesis processing to the image signals from the plurality of input buses 13a to 13c so as to output the resultant output signal 37 through the output terminal (output). Examples of the processing that the synthesis processing section 30 can perform include, in addition to standard image synthesis output processing, so-called keying, which is a technique used to superimpose one image on another, processing using so-called a wipe function (hereinafter, referred to wipe processing), which is a technique of switching images while moving the boundary between a base image and new image from one side to another, and the like.

Further, the synthesis processing section 30 has a function of outputting arbitrary image signals among those on the plurality of input buses 13a to 13c to the parallel interface output 25, through which the image signals are sent to the special effect apparatus 27. Further, after the special effect apparatus 27 applies various special effects to the image signal and outputs the resultant image to the synthesis processing section 30 through the parallel interface input 26, the synthesis processing section 30 can perform the image switching and synthesis processing using the resultant image signals.

The synthesis processing section 30 performs predetermined image switching processing (image transition processing) and synthesis processing according to, for example, a processing pattern set in advance. The processing pattern designates the type of the processing operation to be performed in the synthesis processing section 30. The type of the processing operation includes, for example, image switching using keying technique, image switching using wipe processing, and image switching by changing the ratio between images to be synthesized. In addition, the processing pattern includes information designating the time-series transition of the processing operation. More specifically, this information designates how the boundary or ratio between an original image and new image to be synthesized is changed with time in image switching. The degree of the progress of the processing operation designated by the processing pattern is given as a progress ratio (fader value), where the initial state when the processing pattern is designated is set as 0% and the completion state of the processing operation after progress of the image switching and synthesis processing according to the designated processing pattern is set as 100%.

In addition for the image switching, the synthesis processing section 30 performs the keying synthesis function in order to subtitle an image or superimpose other images. For example, the following configuration is possible: the synthesis processing section 30 uses the input buses 13b and 13a to acquire a base image and a subtitle image, respectively and, after superimposing the subtitle image on the base image, uses the output terminal (output) to output the resultant image as the synthesized output signal 37.

The auxiliary output section 40, which performs selection of an auxiliary output, has a selection switch matrix 17 which allows respective input lines 15a to 15i to which a plurality of image signals are input from an external device to be connected to an auxiliary output selection bus 18. The image signal from an external device is selected and output from an SDI auxiliary output line 21 by the selection switch matrix 17.

The number of the auxiliary output selection buses 18 and that of the SDI auxiliary output lines 21 are not especially limited.

In the case where the special effect apparatus is not connected to the auxiliary output section 40, the auxiliary output section 40 can be used merely for switching an output image directed to other external devices.

The synthesis/switching controller 31 controls the processing operations of the input selection section 12, synthesis processing section 30, and auxiliary output section 40 based on a control signal output from the synthesis/switching operation input section 35. For example, the synthesis/switching controller 31 receives, from the synthesis/switching operation input section 35, a control signal including pattern designation information that designates a processing pattern in the synthesis processing section 30, progress ratio designation information that designates a progress ratio of the processing operation corresponding to the designated processing pattern, and selection designation information that gives instruction on the input image selection switching operation in the selection switch matrix 16 and designates the processing operations in the input selection section 12 and synthesis processing section 30 to thereby control them. Further, the synthesis/switching controller 31 controls the keying synthesis in the synthesis processing section 30 and selection of the auxiliary output image in the selection switch matrix 17 in the same manner.

The type storage section 33 is provided in the synthesis/switching controller 31. The type storage section 33 stores information indicating whether the currently available special effect apparatus is provided with a dedicated interface or SDI interface. The content of the type storage section 33 can be updated with the latest one through the user's operation for the synthesis/switching operation input section 35. Further, the assignment management section 32 is provided in the synthesis/switching controller 31.

The synthesis/switching operation input section 35 has switches for designating or instructing the processing pattern, progress ratio, and keying synthesis operation in the synthesis processing section 30 and the selection switching operation for input images in the input selection section 12 and auxiliary output section 40. An operator's operation for the switches generates the pattern designation information, progress ratio designation information, and selection instruction information and sends them to the synthesis/switching controller 31. For example, the operator operates numerical keys, button switches or the like to designate the number of the processing pattern in the synthesis processing section 30 or the numbers of input lines 15a to 15i and input buses 13a to 13c to be connected to each other in the input selection section 12, or the operator operates fader switches to designate the progress ratio in the synthesis processing section 30. Further, the synthesis/switching operation input section 35 can set the content of the processing pattern in the synthesis processing section 30 through the operator's operation for the switches.

Figure 4:
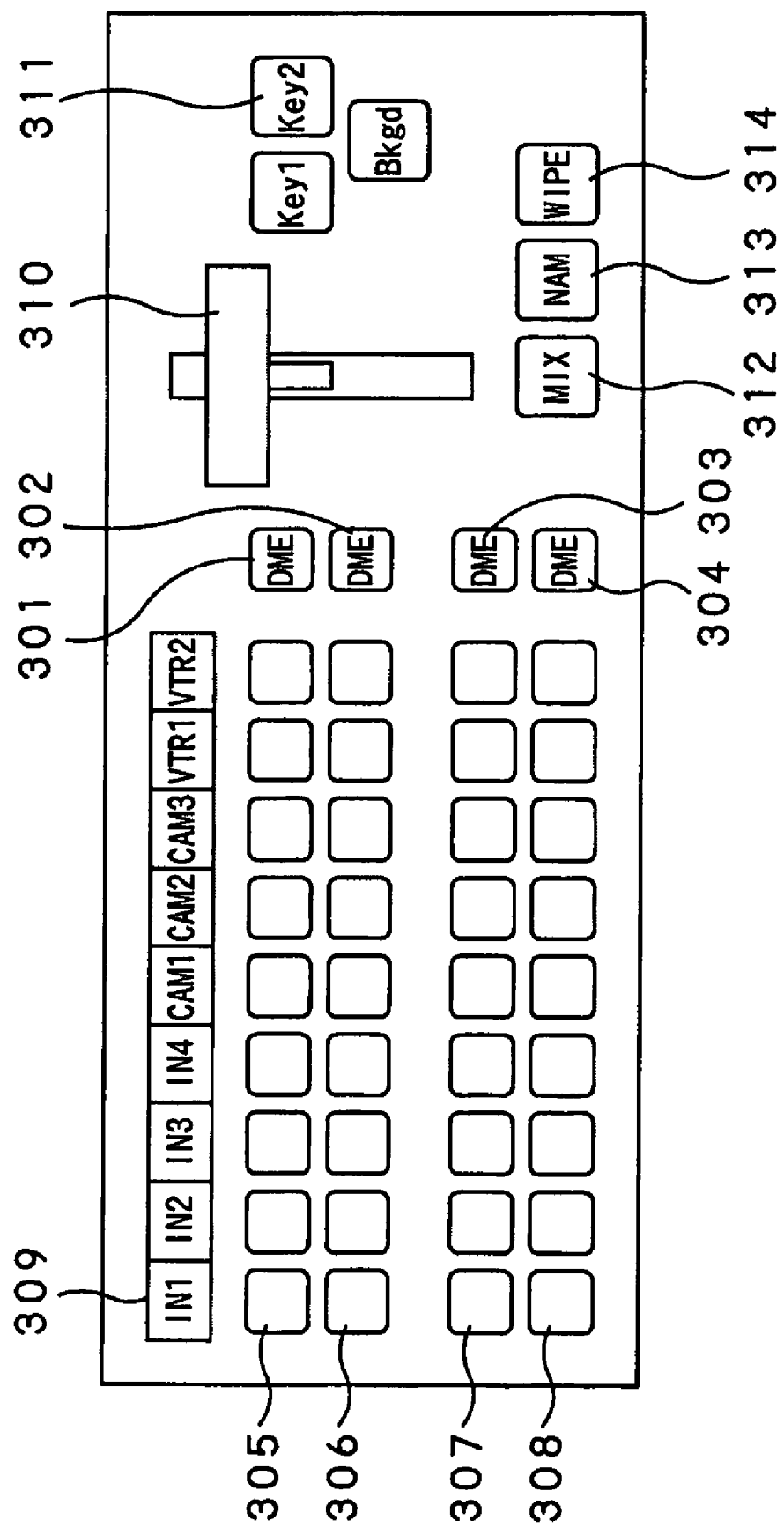
FIG. 4 is a view showing a synthesis/switching operation input section.

FIG. 4 shows buttons and the like arranged on the synthesis/switching operation input section 35. The operator uses the buttons or the like to operate two systems of A and B as a background (Bkgd) input bus and two systems of Key1 and Key2 as an input bus of a keyer, which is used for a keying synthesis image.

More specifically, as shown in FIG. 4, a Key1 "routing through special effect apparatus" instruction button 301, a Key2 "routing through special effect apparatus" instruction button 302, Bkgd-A "routing through special effect apparatus" instruction button 303, and Bkgd-B "routing through special effect apparatus" instruction button 304 are arranged in correspondence with respective input buses. The operator operates these buttons to issue an instruction that causes an image on the relevant input bus to go through one of the special effect apparatus (or the operator operates theses buttons to cancel the "routing through special effect apparatus" instruction). Details of the operation will be described later. Further, Key1 input Xpt selection buttons 305, Key2 input Xpt selection buttons 306, Bkgd-A input Xpt selection buttons 307, and Bkgd-B input Xpt selection buttons 308 are arranged on the synthesis/switching operation input section 35. Further, input name display buttons 309, a fader lever 310, a transition target designation button (Key1, Key2, Bkgd) 311 are arranged. Further, a transition type MIX designation button 312, a transition type NAM designation button 313, and a transition type wipe instruction button 314 are arranged.

The special effect apparatus (B) 27 to be combined with the image switching apparatus 10 has a function of applying, to the image output from the synthesis processing section 30 through the dedicated interface 25, various special effect processing involving a digital computation such as enlarge, reduce, rotation, shift of display position, deform, change of color tone, emphasis on brightness change, and the like. The special effect apparatus 27 inputs the image that has been subjected to special effect processing to the synthesis processing section 30 through the dedicated interface 26. In the special effect apparatus 27, as in the case of the synthesis processing section 30, a processing pattern in which information on the type of the special effect and the transition of its operation has been previously set is designated by the special effect operation input section 28 to allow the image transition operation. The special effect operation input section 28 has switches for the operator to instruct the special effect processing in the special effect apparatus 27.

The special effect apparatus (A) 22 to be combined with the image switching apparatus 10 has a function of applying, to the image output from the auxiliary output section 40 through the SDI auxiliary output line 21, various special effect processing involving a digital computation such as enlarge, reduce, rotation, shift of display position, deform, change of color tone, emphasis on brightness change, and the like. The special effect apparatus 22 inputs the image that has been subjected to special effect processing to the SDI input line 15i. In the special effect apparatus 22, as in the case of the synthesis processing section 30, a processing pattern in which information on the type of the special effect and the transition of its operation has been previously set is designated by the special effect operation input section 23 to allow the image transition operation. In this configuration, the SDI input line (15i) that receives the image from the special effect apparatus 22 is fixedly determined. The special effect operation input section 23 has switches for the operator to instruct the special effect processing in the special effect apparatus (A) 22.

As described above, in the image switching system 1 shown in FIG. 3, the image switching apparatus 10 can perform image switching and synthesis processing such as keying or wipe processing in response to an instruction from the synthesis/switching operation input section 35. Further, the image switching apparatus 10 can utilize the special effect apparatuses 27 provided with the dedicated interface 25 or special effect apparatus 22 provided with the SDI interface 20 by allowing the input image to go through the apparatuses 27 or 22.

The operation to be performed by the instruction that causes the image to go through the special effect apparatus, which is a feature of the present invention, will next be described with reference to flowchart of FIG. 5.

The synthesis/switching controller 31 includes the assignation management section 32 and uses the function thereof to perform operation of utilizing the special effect apparatus.

Figure 5:
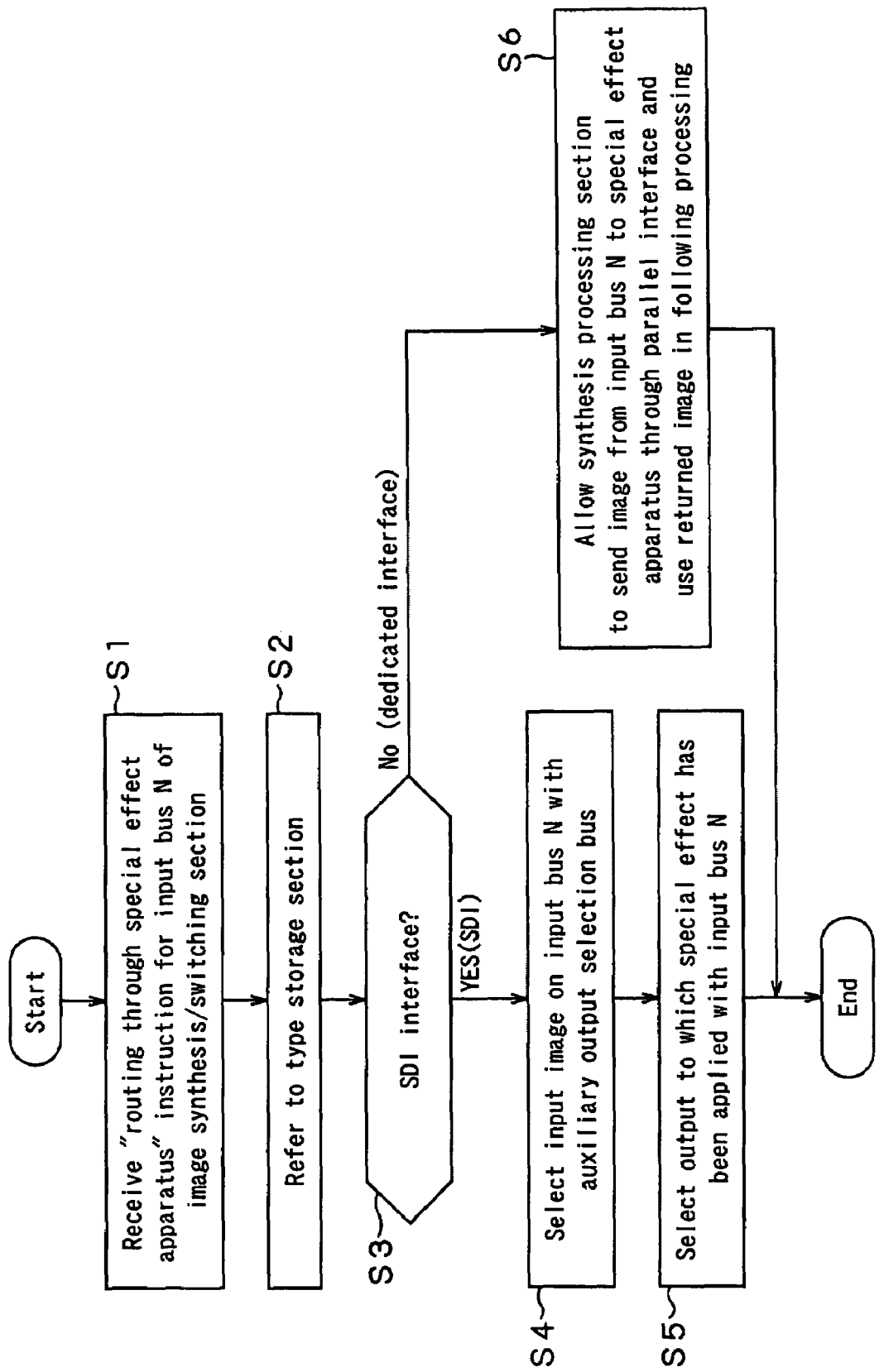
FIG. 5 is a flowchart of an operation corresponding to an instruction through a special effect apparatus.

FIG. 5 is a flowchart for explaining an operation performed when the operator uses the synthesis/switching operation input section 35 to input a "routing through special effect apparatus" instruction.

For example, the operator inputs a "routing through special effect apparatus" instruction for input bus 13a, and the synthesis/switching controller 31 receives the instruction (step S1). Then the synthesis/switching controller 31 refers to the type storage section 33 (step S2) and determines whether the SDI interface or dedicated interface is set (step S3).

In step S3, when determining that the SDI interface is set (Yes in step S3), the synthesis/switching controller 31 advances to step S4 and selects the input image on input bus 13a with an auxiliary output selection bus 18.

At the same time, the synthesis/switching controller 31 selects, with input bus 13a, SDI input line 19i which holds the output to which the special effect has been applied (step S5). As a result, the image that has gone through the special effect apparatus 22 can be input to the synthesis processing section 30.

On the other hand, when determining that the dedicated interface is set (No in step S3), the synthesis/switching controller 31 advances to step S6 and allows the synthesis processing section 30 to send the image from input bus 13a to the special effect apparatus 27 through the parallel interface 25 and to acquire the image returned through the parallel interface 26 (step S6). As a result, the image that has gone through the special effect apparatus 27 can be input to the synthesis processing section 30.

Figure 6:
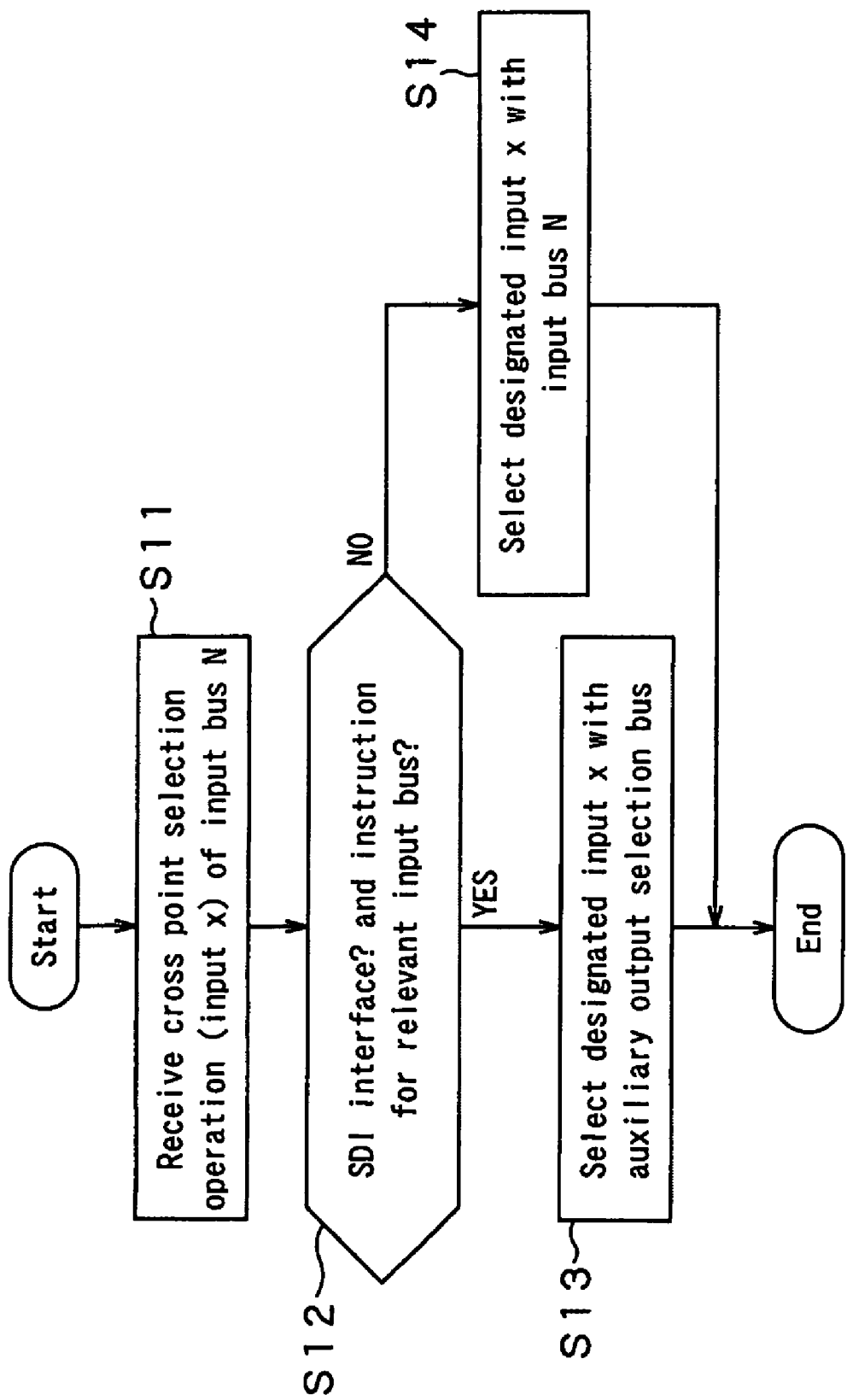
FIG. 6 is a flowchart of an operation corresponding to an input selection instruction.

FIG. 6 is a flowchart for explaining an operation when the operator uses the synthesis/switching operation input section 35 to input an input selection instruction designating input bus 13a. Firstly, the operator uses the synthesis/switching operation input section 35 to input the input selection instruction, and the synthesis/switching controller 31 receives selection operation of input x (step S11). Then the synthesis/switching controller 31 refers to the type storage section 33 and determines whether the instruction is made for the bus going through the special effect apparatus, and whether the SDI interface or dedicated interface is set (step S12).

When determining that the SDI interface is set (Yes in step S12), the synthesis/switching controller 31 advances to step S13 and selects the input x with auxiliary output selection bus 18 without switching input bus 13a.

On the other hand, when determining that the dedicated interface is set or the instruction has been made for the bus that does not go through the special effect apparatus (No in step S12), the synthesis/switching controller 31 advances to step S14 and selects the input x with input bus 13a.

Thus, it is possible to correctly select the input selection image and send the image to the synthesis processing section 30 through the special effect apparatus irrespective of using the special effect apparatus 22 or special effect apparatus 27.

When receiving an instruction to cancel the "routing through special effect apparatus", the synthesis/switching controller 31 performs processing of restoring selections of respective buses (when the SDI interface is set, the synthesis/switching controller 31 performs processing of shifting the selection of the auxiliary output selection bus to the input bus 13a). This is obvious and the processing procedure there of is omitted.

Figure 7:
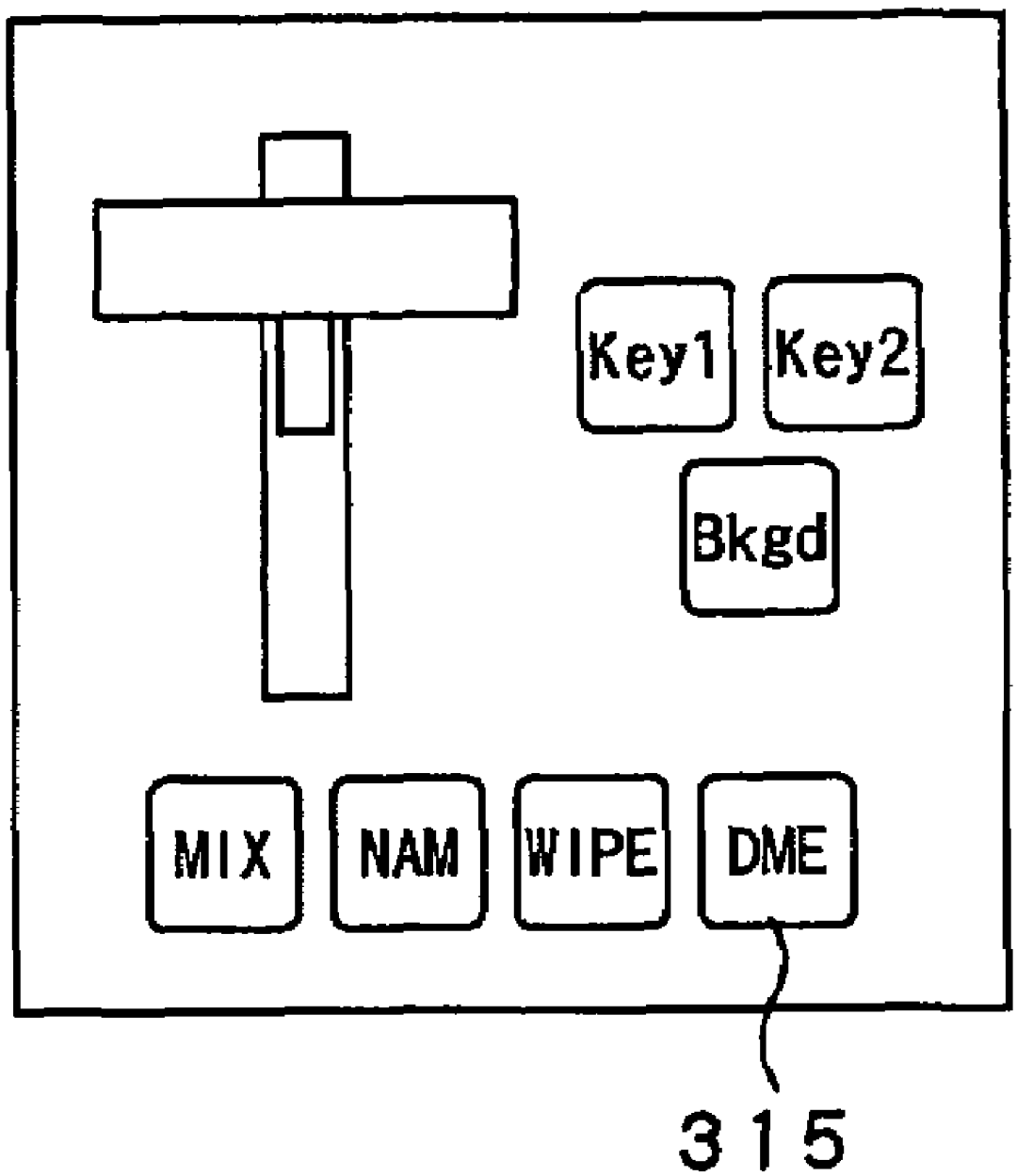
FIG. 7 is a view showing another type of the synthesis/switching operation input section.

FIG. 7 shows a synthesis/switching operation input section 35' having a special effect instruction as an option of image switching transition type as another type of operation input section. When the special effect instruction (instruction using the special effect apparatus) is provided for the switching transition type, a control signal needs to be sent from the synthesis/switching controller 31 to respective special effect apparatuses, and, therefore, the synthesis/switching controller 31 and each of the special effect apparatus needs to be connected through a control line for exchanging the control signal.

When the transition type special effect instruction button 315 is selected, the special effect is selected as a switching transition type. The synthesis/switching controller 31 then allows an image on the bus to be switched to go through the special effect apparatus according to the setting in the type storage section 33 in the same manner as the above processing and sends switching control (progress ratio, etc.) to any of the special effect apparatuses according to the setting in the type storage section 33, to thereby perform the switching transition.

In this case, a common control information to the synthesis/switching controller 31 and special effect apparatus is supplied from the synthesis/switching operation input section 35 to the synthesis/switching controller 31. To the special effect apparatus, switching pattern designation information, progress ratio designation information, and the like are supplied through the synthesis/switching controller 31. That is, operation control for the special effect apparatus and synthesis processing section 30 can be performed by using only the synthesis/switching operation input section 35.

As described above, the synthesis/switching controller 31 refers to the type storage section 33 to determine the following processing. With this configuration, it is possible to use special effect apparatuses provided with different interfaces from each other in the same manner only by changing the setting. Further, it is possible to select a desired input by the same operation as in the case where the processing does not involve the special effect apparatus.

In the image switching system 1, the operator uses the synthesis/switching operation input section 35 or the like to manually set the type of the interface of the special effect apparatus in advance to the type storage section 33 of the synthesis/switching controller 31.

It is preferable that a communication path connecting the synthesis/switching controller 31 and external special effect apparatus 22 or 27 be provided. In this case, the special effect apparatus notifies the synthesis/switching controller 31 of own type (interface type) at the time when the both controller 31 and apparatus 22 or 27 are activated to establish the connection between them. Upon receiving the notification, the synthesis/switching controller 31 writes the received type into the type storage section 33. This process eliminates the need for the operator to perform the manual setting for the type storage section 33 and allows an interface suitable to the provided special effect apparatus to be automatically selected.

A second embodiment of the present invention will next be described. The second embodiment is an image switching system 5 having the image switching apparatus which is a concrete example of the present invention.

Figure 8:
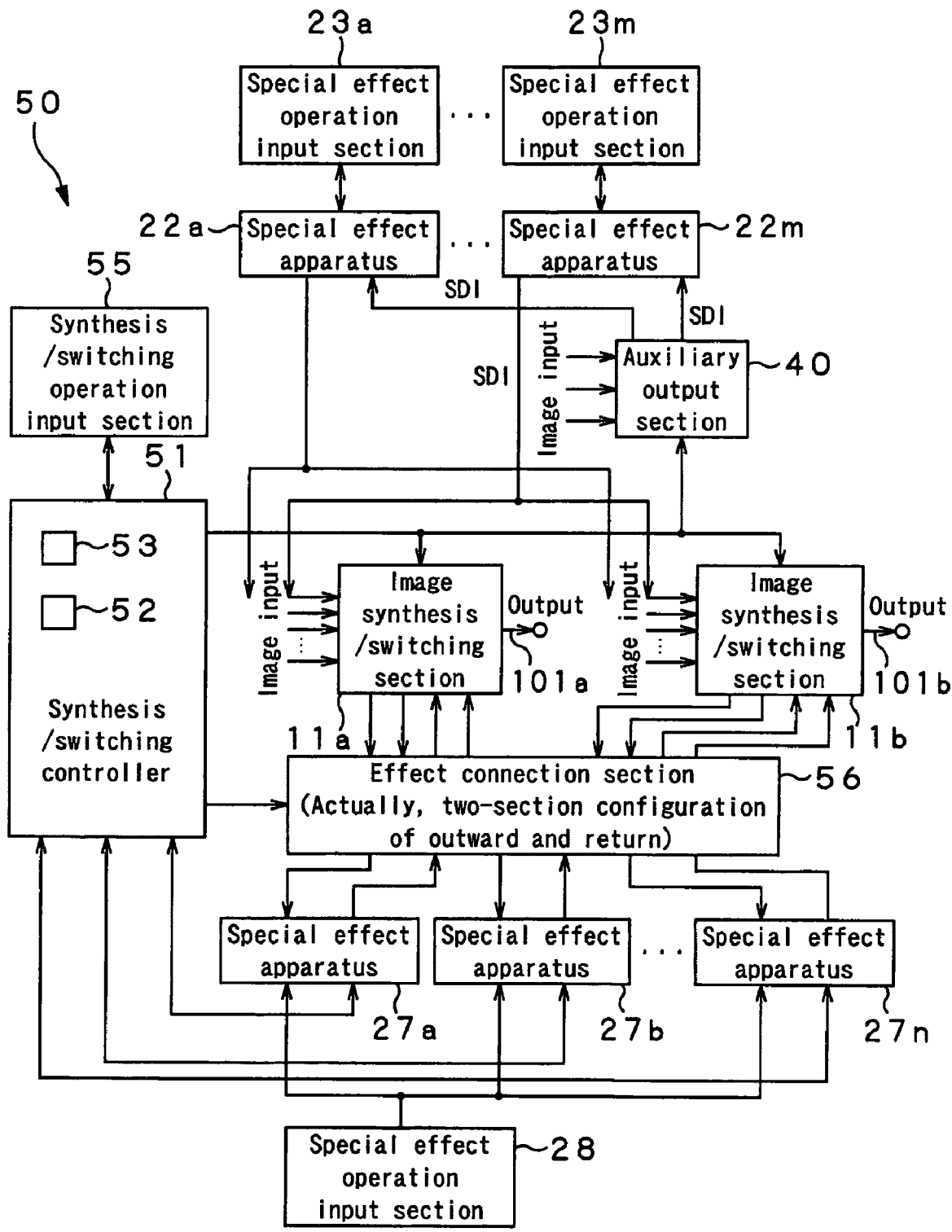
FIG. 8 is a view showing a configuration of an image switching system according to a second embodiment.

In the image switching system 5 shown in FIG. 8, an image switching apparatus 50 includes a plurality of image synthesis/switching sections 11a and 11b serving as a switcher apparatus which performs switching of output and synthesis processing for a plurality of input image signals, an auxiliary output section 40 which performs selection of an auxiliary output, a synthesis/switching controller 51 which controls the entire apparatus, and a synthesis/switching operation input section 55 for the operator to perform input operation for the output switching and synthesis processing in the image synthesis/switching sections 11a and 11b.

In the image switching system 5, the image switching apparatus 50 is connected to a plurality of external special effect apparatuses to perform image switching and synthesis processing involving special effects. Hereinafter, a connection relation between each of the two systems of special effect apparatuses and image switching apparatus 50 that constitute the image switching system 5 will be described.

The image switching apparatus 50 can use external special effect apparatuses 22a . . . 22m which receive an image from the auxiliary output section 40 through the SDI interfaces, apply various special effects to the image, and send the resultant image to one of SDI input lines (line group) through the SDI interfaces. Special effect operation input section 23a . . . 23m receive an operator's input operation for the special effect processing in the special effect apparatuses 22a . . . 22m. As an SDI special effect apparatus input, a transmission path including a pair of V and K is provided in most cases.

Further, the image switching apparatus 50 can use special effect apparatuses 27a, 27b . . . 27n which receive an image from the image synthesis/switching sections 11a and 11b through dedicated parallel interfaces, apply various special effects to the image, and return the resultant image to the image synthesis/switching sections 11a and 11b through dedicated parallel interfaces. The special effect operation input section 28 receives an operator's input operation for the special effect processing in the special effect apparatuses 27a, 27b . . . 27m.

The plurality of special effect apparatuses 27a, 27b . . . 27n (the number of apparatuses to be used is not limited) are connected by dedicated parallel interfaces to the image switching apparatus 50 through an effect connection section 56 having an interface switching function. With this configuration, the special effect apparatuses 27a, 27b . . . 27n are dynamically assigned to the image synthesis/switching sections 11a and 11b. The effect connection section 56 is controlled by the synthesis/switching controller 51.

The image synthesis/switching sections 11a and 11b include, like the image synthesis/switching section 11 shown in FIG. 3, an input selection section 12 which selects a plurality of input image signals so as to connect to a plurality of output channels, and a synthesis processing section 30 which applies various synthesis processing to image signals output from the input selection section 12 and outputs the resultant output signal.

As described above, the configuration in the image switching sections 11a and 11b is the same as that shown in FIG. 3, and the description thereof is omitted.

Further, the configurations of the auxiliary output section 40 and synthesis/switching controller 51 are the same as those of the auxiliary output section 40 and synthesis/switching controller 31 shown in FIG. 3.

In the configuration described above, the two systems of special effect apparatuses and image synthesis/switching sections 11a and 11b are not fixedly combined, but can be arbitrarily combined as far as the number of the apparatuses to be connected does not exceed the allowable range.

The type storage section 53 of the synthesis/switching controller 51 has a storage area that stores the type of the special effect apparatus by the number corresponding to the number of the available special effect apparatuses. The special effect apparatus is identified by number. The special effect apparatus of a certain number is provided with the SDI interface or parallel interface, and such information is set in the type storage section 53. Further, in the case where the special effect apparatus is provided with the SDI interface, an auxiliary output selection bus number and SDI input line number are set for each number of the special effect apparatus. In general, a pair of V and K is required for the bus and line, and the number to be set is stored in pairs.

Figures 9, 10:
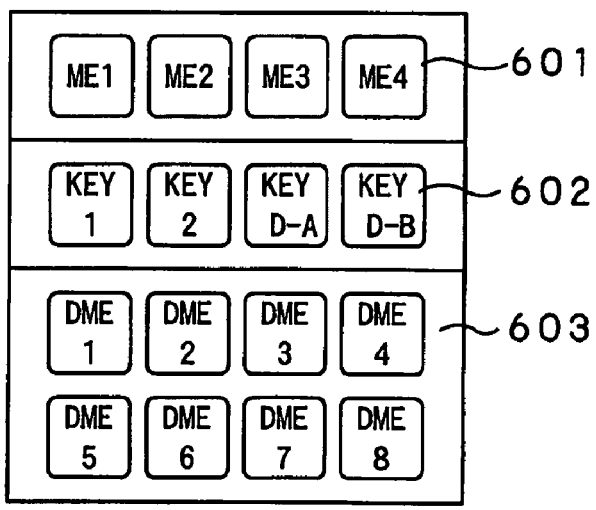
FIG. 9 is a view showing an example of the content of a type storage section.
FIG. 10 is a view for explaining an operation input section.

The content of the type storage section 53 can be set from the synthesis/switching operation input section 55. FIG. 9 shows an example of the content 90 of the type storage section 53. It should be noted that the content does not correspond to the following operation description. In FIG. 9, "1" to "4" of "Number" column 91 correspond to respective special effect apparatuses. As shown in "I/F" column 92, the special effect apparatuses of Nos. "1" and "2" are provided with the SDI interface. As shown in "Auxiliary output bus number" column 93, the auxiliary output bus number of the special effect apparatus of No. 1 is "7,8" and that of the special effect apparatus of No. 2 is "9,10". As shown in "Input line number" column 94, the input line number of the special effect apparatus of No. 1 is "17,18" and that of the special effect apparatus of No. 2 is "19,20".

Some special effect apparatus may receive another type of input as an option in addition to the V-K pair. In such a case, the type storage section 53 stores additional auxiliary output bus number.

FIG. 10 is a view showing "routing through special effect apparatus" instruction buttons and its related buttons provided on the synthesis/switching operation input section 55. Image synthesis/switching section selection buttons 601 marked "ME1", "ME2", "ME3", and "ME4" are buttons for selecting the target image synthesis/switching section. Only one button that has been depressed last lights up, which indicates the selected state. That is, a depression of a button that does not light up allows the selected button to light up.

Target bus selection buttons 602 marked "KEY1", "KEY2", "BKGD-A", and "BKGD-B" are buttons for selecting the target input bus. Only one button that has been depressed last lights up, which indicates the selected state. That is, a depression of a button that does not light up allows the selected button to light up.

The "routing through special effect apparatus" instruction buttons 603 marked "DME1" to "DME8" are buttons for instructing the image on the bus selected by the image synthesis/switching section selection buttons 601 and target bus selection buttons 602 to go through the special effect apparatus. A depression of the "routing through special effect apparatus" instruction button 603 allows the button 603 to light up, which indicates that the relevant image goes through the special effect apparatus. A depression of the lighting button 603 allows the selected button to light off, which indicates that the relevant image does not go through the special effect apparatus.

As described above, a plurality (eight) of "routing through special effect apparatus" instruction buttons 603 are provided in the synthesis/switching operation input section 55. By these "routing through special effect apparatus" instruction buttons 603, the operator can select any of the special effect apparatuses. It should be noted that it is impossible to designate the special effect apparatus that has already been used for another bus (bus of another image synthesis/switching section or another bus of the same image synthesis/switching section) even if the relevant button is depressed. Further, the number of the special effect apparatuses that can be utilized from one image synthesis/switching section 11 is limited, for example, up to two systems, and three systems or more of the special effect apparatuses cannot be utilized from one image synthesis/switching section 11.

Figure 11:
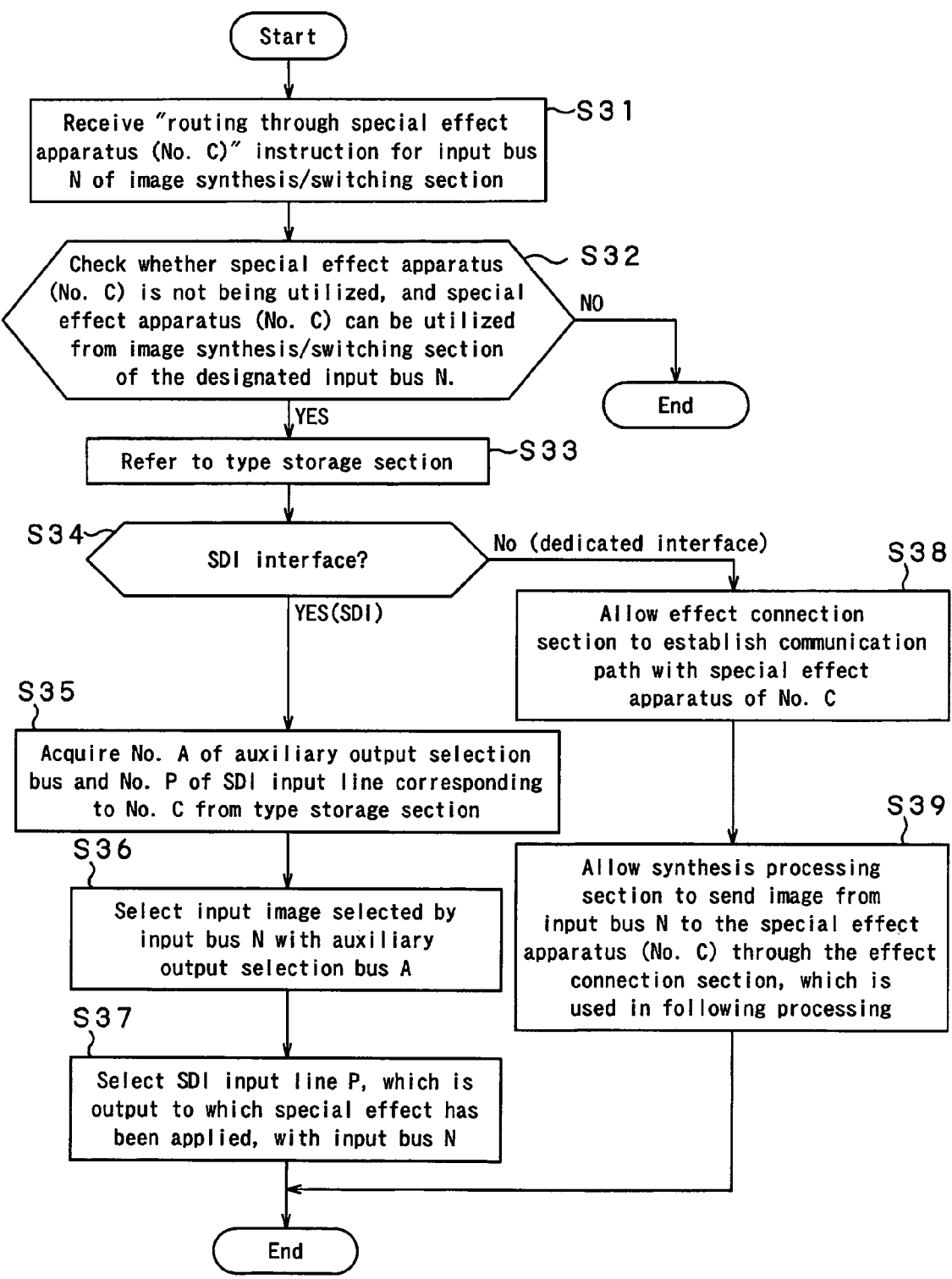
FIG. 11 is a flowchart of an operation corresponding to a "routing through special effect apparatus" instruction.
Figure 12:
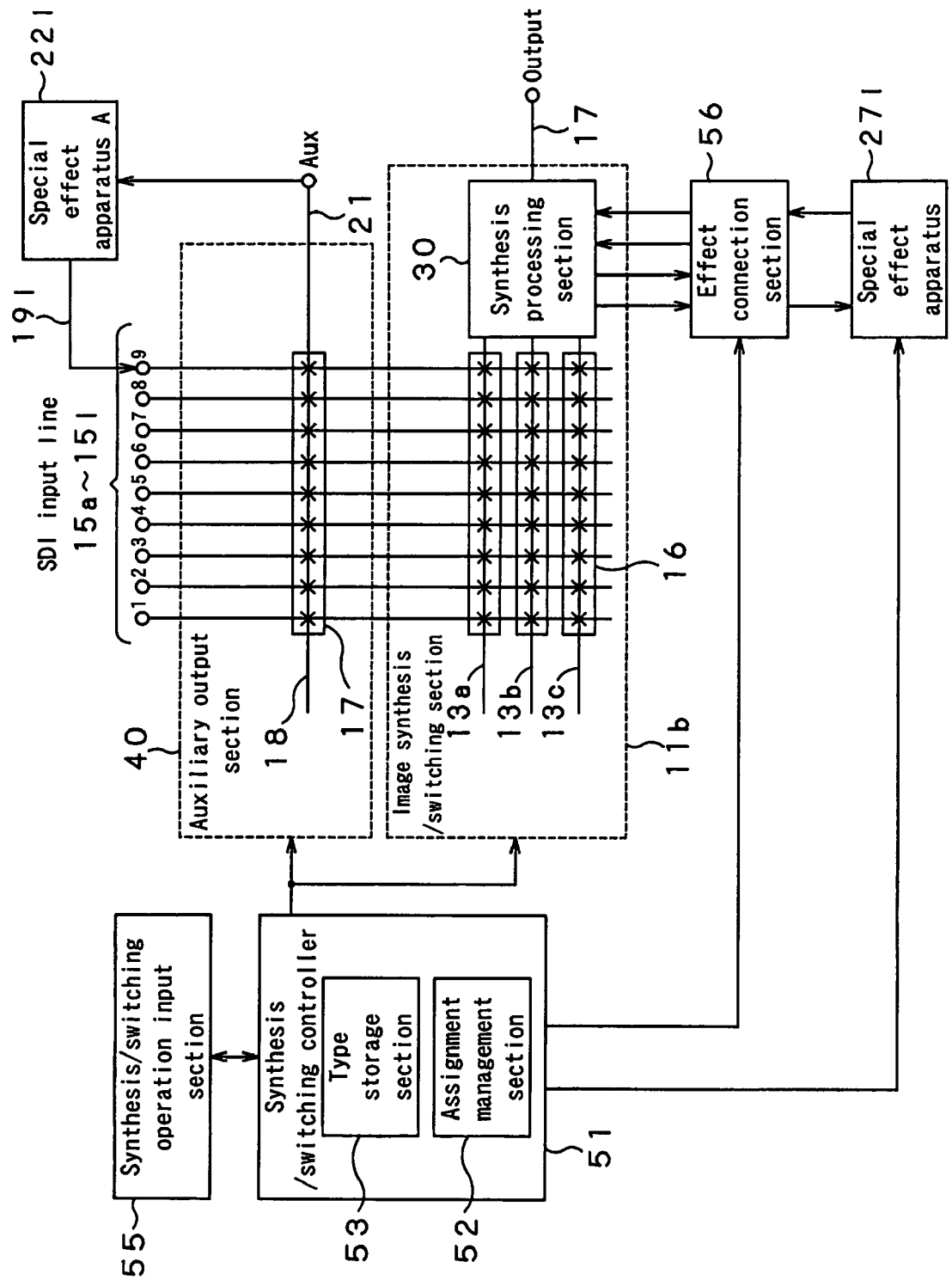
FIG. 12 is a view showing a connection relation between respective elements in an image synthesis/switching section and peripheral sections.

FIG. 11 is a flowchart for explaining an operation when the operator uses the synthesis/switching operation input section 55 to input the "routing through special effect apparatus" instruction. For simplifying the description, V-K pair of the path to be stored in the type storage section is represented by one number. Further, the following description will be made with reference to the table of FIG. 9, using variable C in the table. FIG. 12 is a view showing a connection relation between respective elements in the image synthesis/switching section 11b and peripheral sections.

For example, the operator inputs the "routing through special effect apparatus (No. C)" instruction for input bus 13a, and the synthesis/switching controller 51 receives the instruction (step S31). Then the synthesis/switching controller 51 checks, in step S32, whether the special effect apparatus (No. C) is not being utilized, and the special effect apparatus (No. C) can be utilized from the image synthesis/switching section 11b of the designated input bus 13a. When checking the above condition in step S32 and determining that the special effect apparatus (No. C) is available (YES), the synthesis/switching controller 51 advances to step S33 and refers to the type storage section 53 having the content as shown in FIG. 9. By referring to the type storage section 53, the synthesis/switching controller 51 determines whether the SDI interface or dedicated interface is set with respect to the special effect apparatus (No. C) designated in row 95.

When determining, in step S34, that the SDI interface is set (Yes in step S34), the synthesis/switching controller 51 advances to step S35 and acquires, from the type storage section 53, No. A (18) of the auxiliary output selection bus and No. P (19) of the SDI input line corresponding to No. C. The synthesis/switching controller 51 then selects an input image selected by the input bus N (13a) with the auxiliary output selection bus A (18) corresponding to the special effect apparatus (No. C) in step S36.

At the same time, the synthesis/switching controller 51 selects, with input bus N (13a), SDI input line (input line corresponding to the number of the special effect apparatus) P (19i) on which the output (19) to which the special effect has been applied is supplied from the special effect apparatus corresponding to No. C. As a result, the image that has gone through the special effect apparatus 22i can be input to the synthesis processing section 30 in the image synthesis/switching section.

On the other hand, when determining, in step S34, that the dedicated interface is set (No in step S34) by referring to row 96 in the table of FIG. 9, the synthesis/switching controller 51 advances to step S38 and allows the effect connection section 56 to establish a communication path with the special effect apparatus 27i of No. C. Then, in step S39, the synthesis/switching controller 51 allows the synthesis processing section 30 to send the image from input bus (13a) to the special effect apparatus 27i through the effect connection section 56 and to acquire the image returned through the effect connection section 56, which is used in the following processing.

At the same time, the synthesis/switching controller 51 controls the effect connection section 56 to establish input/output (forward/return) path of the image with the special effect apparatus 27i of the corresponding number. As a result, it is possible to input the image that has gone through the special effect apparatus 27i to the synthesis processing section 30.

Figure 13:
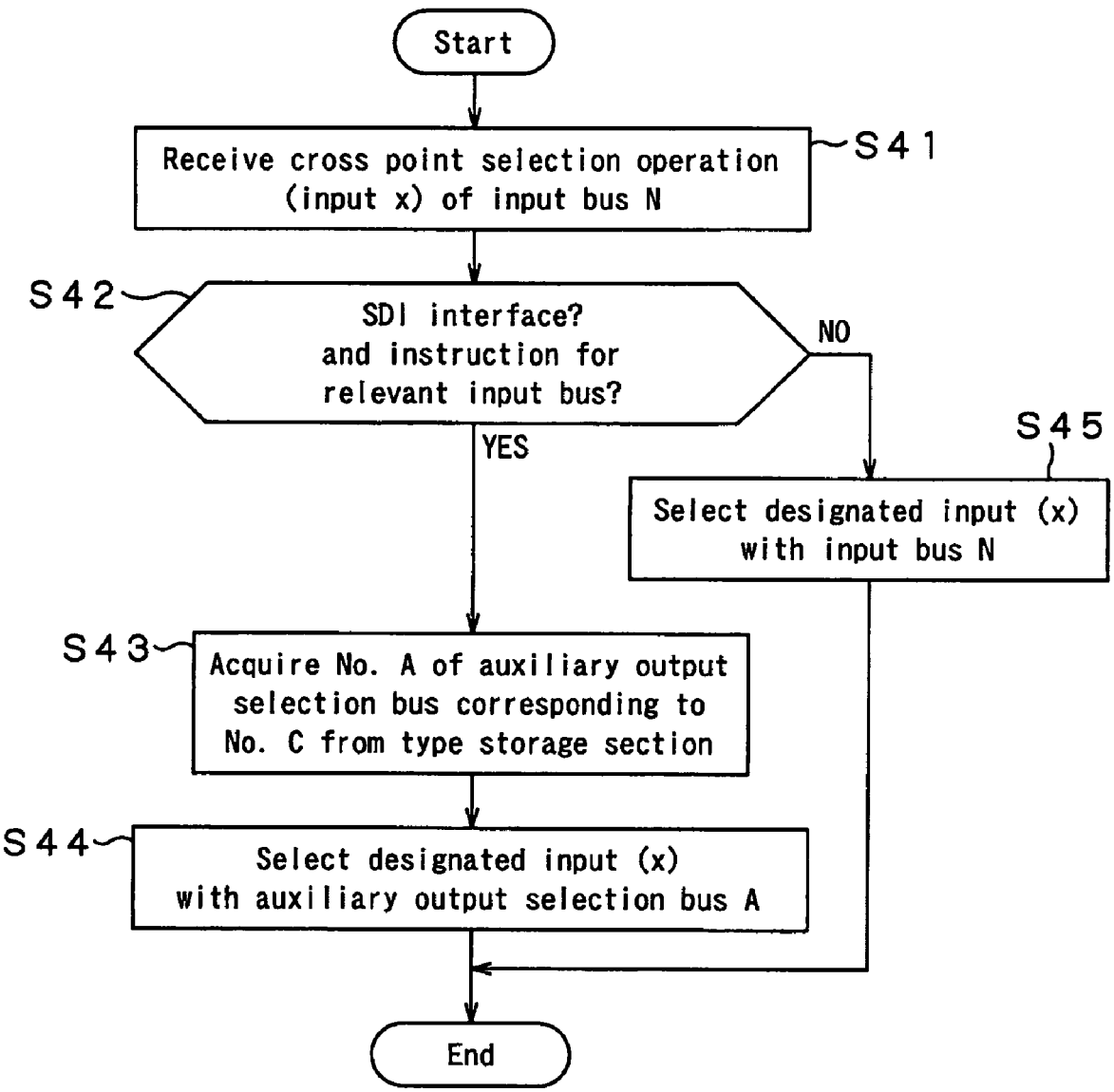
FIG. 13 is a flowchart of an operation corresponding to an input selection instruction.

FIG. 13 is a flowchart for explaining an operation when the operator uses the synthesis/switching operation input section 55 to input an input selection instruction designating input bus (13a). Firstly, the operator uses the synthesis/switching operation input section 55 to input the input selection instruction, and the synthesis/switching controller 51 receives selection operation of input x (step S41). Then the synthesis/switching controller 51 refers to the type storage section 53 and determines whether the instruction is made for the bus going through the special effect apparatus, and whether the SDI interface or dedicated interface is set (step S42).

When determining, in step S42, that the SDI interface is set (Yes in step S42) by referring to the content as exemplified in the row 95 in the table of FIG. 9, the synthesis/switching controller 51 advances to step S43 and acquires No. A of the auxiliary output selection bus corresponding to No. C from the type storage section 53. The synthesis/switching controller 51 then selects the input x with auxiliary output selection bus A in step S43.

On the other hand, when determining, in step S42, that the dedicated interface is set or the instruction has been made for the bus that does not go through the special effect apparatus (No in step S42) by referring to the content as exemplified in the row 96 in the table of FIG. 9, the synthesis/switching controller 51 advances to step S45 and selects the designated input x with input bus N.

Thus, it is possible to correctly select the input selection image and send the image to the synthesis processing section 30 through the special effect apparatus irrespective of using the special effect apparatus 22 or special effect apparatus 27.

The control of the synthesis/switching controller 51 using the type storage section 53 as described above allows the mixed use of two special effect apparatuses provided with different interfaces from each other in the configuration in which a plurality of special effect apparatus are connected to the system. Further, it is always possible to select a desired input by the same operation as in the case where the processing does not involve the special effect apparatus.

A third embodiment of the present invention will next be described. The third embodiment is an image switching system 9 having the image switching apparatus which is a concrete example of the present invention.

Figure 14:
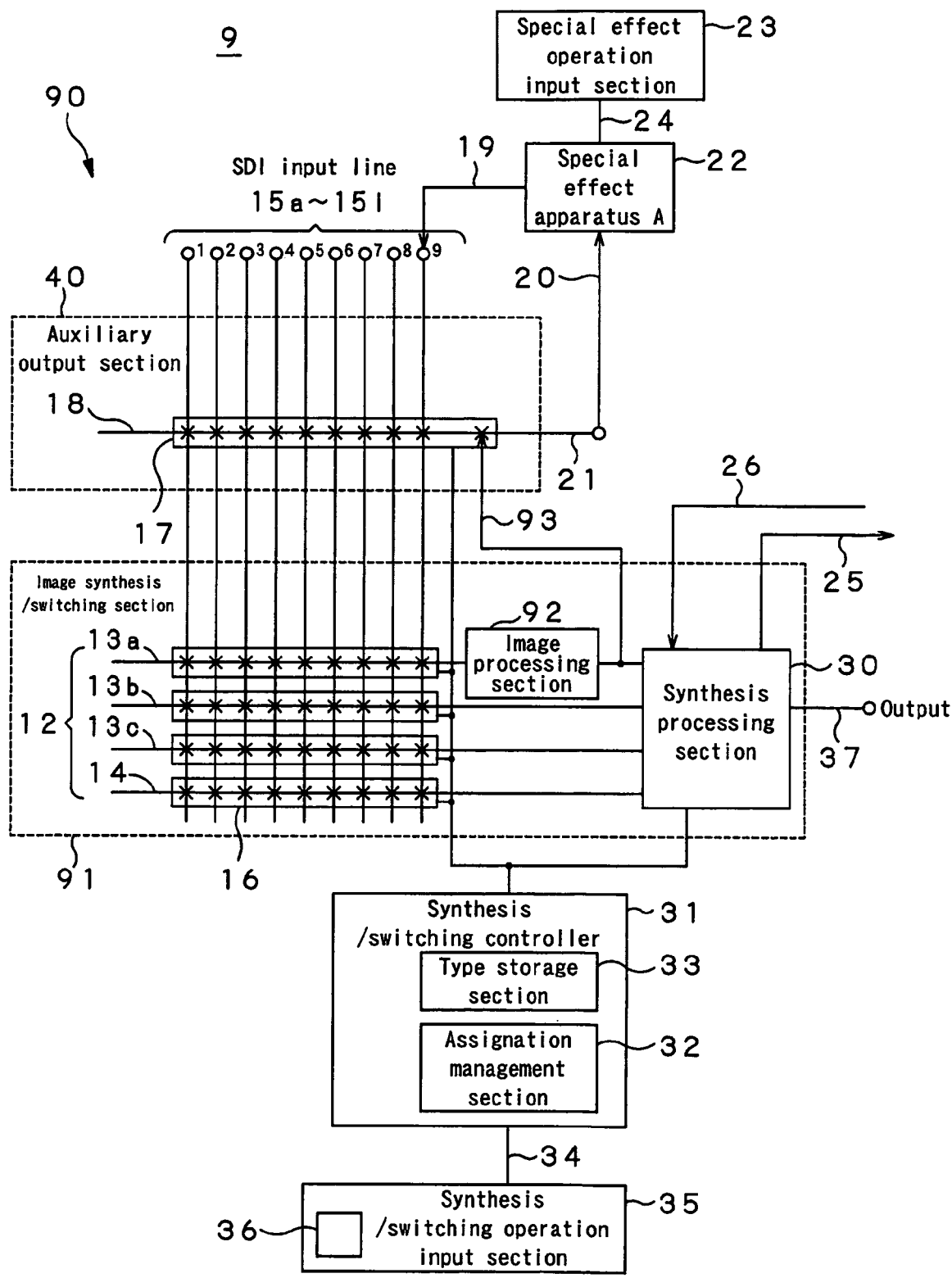
FIG. 14 is a view showing a configuration of an image switching system according to a third embodiment.

In the image switching system 9 shown in FIG. 14, an image switching apparatus 90 includes an image synthesis/switching section 91 serving as a switcher apparatus which performs switching of output and synthesis processing for a plurality of input image signals, an auxiliary output section 40 which performs selection of an auxiliary output, a synthesis/switching controller 31 which controls the entire apparatus, and a synthesis/switching operation input section 35 for the operator to perform input operation for the output switching and synthesis processing in the image synthesis/switching section 91.

In the image switching system 9, the image switching apparatus 90 performs synthesis processing after the processing for an image in the image synthesis/switching section 91 has been completed. The special effect apparatuses 22 and 27 are connected to the image switching apparatus 90 so as the processed image is then subjected to special effect processing.

The image synthesis/switching section 91 includes an image processing section 92 in addition to an input selection section 12 and synthesis processing section 30. The image processing section 92 can be disposed on input buses 13a to 13c or preliminary input buses 14. When being disposed on a bus, the image processing section 92 can apply processing to an image received from the bus on which the image processing section 92 is disposed. For example, the image processing section 92 changes the signal waveform of the image so as to make the image suitable for keying synthesis. The image that has been processed in the image processing section 92 is sent to an auxiliary output selection bus 18 as one input through a processed image reentry path 93.

In FIG. 14, the image processing section 92 receives one input and outputs one output. Alternatively, however, the above configuration can be applied to the configuration in which the image processing section 92 receives an input pair of an image for Video and image for Key source and outputs the processed image in pairs. In this case, the image processing section 92 has two inputs and two outputs, and the processed image reentry path 93 correspondingly has two paths.

The preliminary input bus 14 has the same function as those of the input buses 13a to 13c. However, the operator cannot directly designate an input selection for the preliminary input bus 14 from the synthesis/switching operation input section 35. That is, the preliminary input bus 14 is a bus for internal use, and is transparent for the operator.

In FIG. 14, as to, for example, the SDI auxiliary output line, only a single path is shown. Actually, however, a transmission path including a pair of V and K is provided in most cases. Further, although the description of the elements around the special effect apparatus (B) 22 is omitted in FIG. 14, the image switching apparatus 90 can be connected to a plurality of special effect apparatus 27a, 27b ... 27n through the effect connection section 56 as in the case of the configuration shown in FIG. 6.

Figure 15:
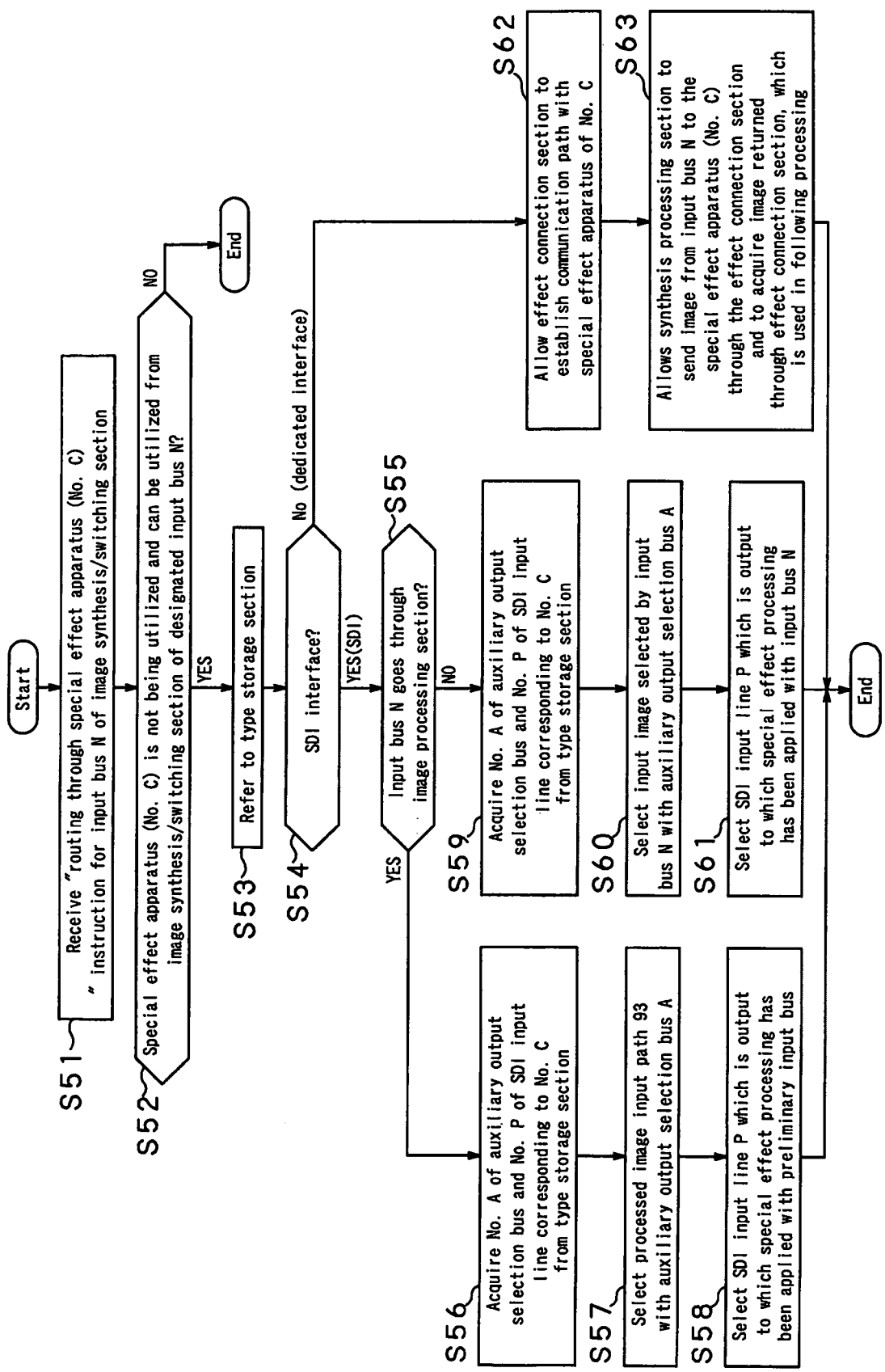
FIG. 15 is a flowchart of an operation corresponding to an instruction through a special effect apparatus.

Next, as to an operation of the image switching apparatus 90 that constitutes the image switching system 9, different points from the first embodiment will be described. FIG. 15 is a flowchart for explaining an operation when the operator uses the synthesis/switching operation input section 35 to input the "routing through special effect apparatus" instruction.

For example, the operator inputs the "routing through special effect apparatus (No. C)" instruction for input bus 13a, and the synthesis/switching controller 31 receives the instruction (step S51). Then the synthesis/switching controller 31 checks, in step S52, whether the special effect apparatus (No. C) is not being utilized, and the special effect apparatus (No. C) can be utilized from the image synthesis/switching section 11 of the designated input bus 13a.

When checking the above condition in step S52 and determining that the special effect apparatus (No. C) is available (YES), the synthesis/switching controller 31 advances to step S53 and refers to the type storage section 33 having the content as shown in FIG. 9. By referring to the type storage section 33, the synthesis/switching controller 31 determines, in step S54, whether the SDI interface or dedicated interface is set with respect to the special effect apparatus (No. C) designated in row 95.

When determining, in step S54, that the SDI interface is set (Yes in step S54), the synthesis/switching controller 31 advances to step S55 and checks whether input bus N (13a) is a bus that goes through the image processing section 92. When determining, in step S55, that input bus N (13a) goes through the image processing section 92 (YES in step S55), the synthesis/switching controller 31 advances to step S56.

In step S56, the synthesis/switching controller 31 acquires, from the type storage section 33, No. A (18) of the auxiliary output selection bus and No. P (19) of the SDI input line corresponding to No. C from the type storage section 33. The synthesis/switching controller 31 then selects the processed image reentry path 93 with the auxiliary output selection bus A (18) in step S57. In step S58, the synthesis/switching controller 31 selects, with the preliminary input bus 14, SDI input line P which is an output to which the special effect has been applied.

When determining, in step S55, that the input bus N is a bus that does not go through the image processing section 92 (No in step S55), the synthesis/switching controller 31 advances to step S59 and acquires, from the type storage section 33, No. A of the auxiliary output selection bus and No. P of the SDI input line corresponding to No. C. Then, in step S60, the synthesis/switching controller 31 selects an input image selected by the input bus N with the auxiliary output selection bus A, and, in step S61, selects SDI input line P, which is an output to which the special effect has been applied, with input bus N.

On the other hand, when determining, in step S54, that the dedicated interface is set (No in step S54), the synthesis/switching controller 31 advances to step S62 and allows the effect connection section 56 having the configuration as shown in FIG. 8 to establish a communication path with the special effect apparatus 27i of No. C. Then, in step S63, the synthesis/switching controller 31 allows the synthesis processing section 30 to send the image from input bus N to the special effect apparatus 27i through the effect connection section 56 and to acquire the image returned through the effect connection section 56, which is used in the following processing.

At the same time, the synthesis/switching controller 31 controls the effect connection section 56 to establish input/output (forward/return) path of the image with the special effect apparatus 27i of the corresponding number. As a result, it is possible to input the image that has gone through the special effect apparatus 27i to the synthesis processing section 30.

Figure 16:
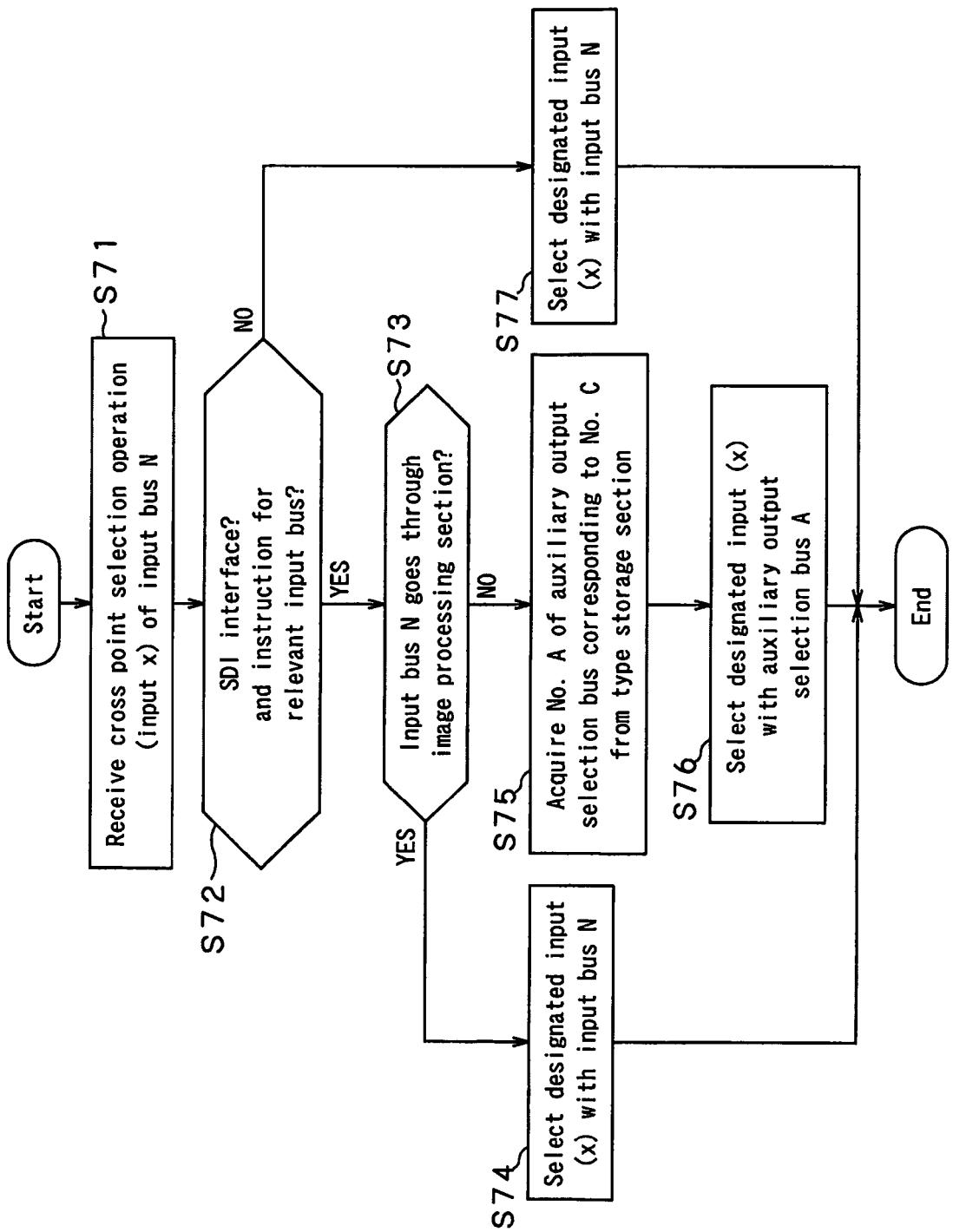
FIG. 16 is a flowchart of an operation corresponding to an input selection instruction.

FIG. 16 is a flowchart for explaining an operation when the operator uses the synthesis/switching operation input section 35 to input an input selection instruction designating input bus (13a). Firstly, the operator uses the synthesis/switching operation input section 35 to input the input selection instruction, and the synthesis/switching controller 31 receives selection operation of input x (step S71). Then the synthesis/switching controller 31 refers to the type storage section 33 and determines whether the instruction is made for the bus going through the special effect apparatus, and whether the SDI interface or dedicated interface is set (step S72).

When determining, in step S72, that the SDI interface is set (Yes in step S72), the synthesis/switching controller 31 advances to step S73 and checks whether input bus N is a bus that goes through the image processing section 92 by referring to the type storage section 33. When determining, in step S73, that input bus N goes through the image processing section 92, the synthesis/switching controller 31 advances to step S74 and selects the designated input x with input bus N.

When determining, in step S73, that the input bus N is a bus that does not go through the image processing section 92 (No in step S73), the synthesis/switching controller 31 advances to step S75 and acquires, from the type storage section 33, No. A of the auxiliary output selection bus corresponding to No. C. Then, the synthesis/switching controller 31 advances to step S 76 and selects the designated input x with the auxiliary output selection bus A.

On the other hand, when determining, in step S72, that the dedicated interface is set or the instruction has been made for the bus that does not go through the special effect apparatus (No in step S72), the synthesis/switching controller 31 advances to step S77 and selects the designated input x with input bus N.

The operation based on the above control allows a desired input to be selected by the same operation as in the case where the bus does not go through the special effect apparatus or image processing section 92 and allows application of the special effects to the image previously processed in the image processing section 92.

FIGS. 17 to 22 are views each showing a signal processing flow when various digital multi effect (DME) processing are performed in the image switching system 9.

Figure 17:
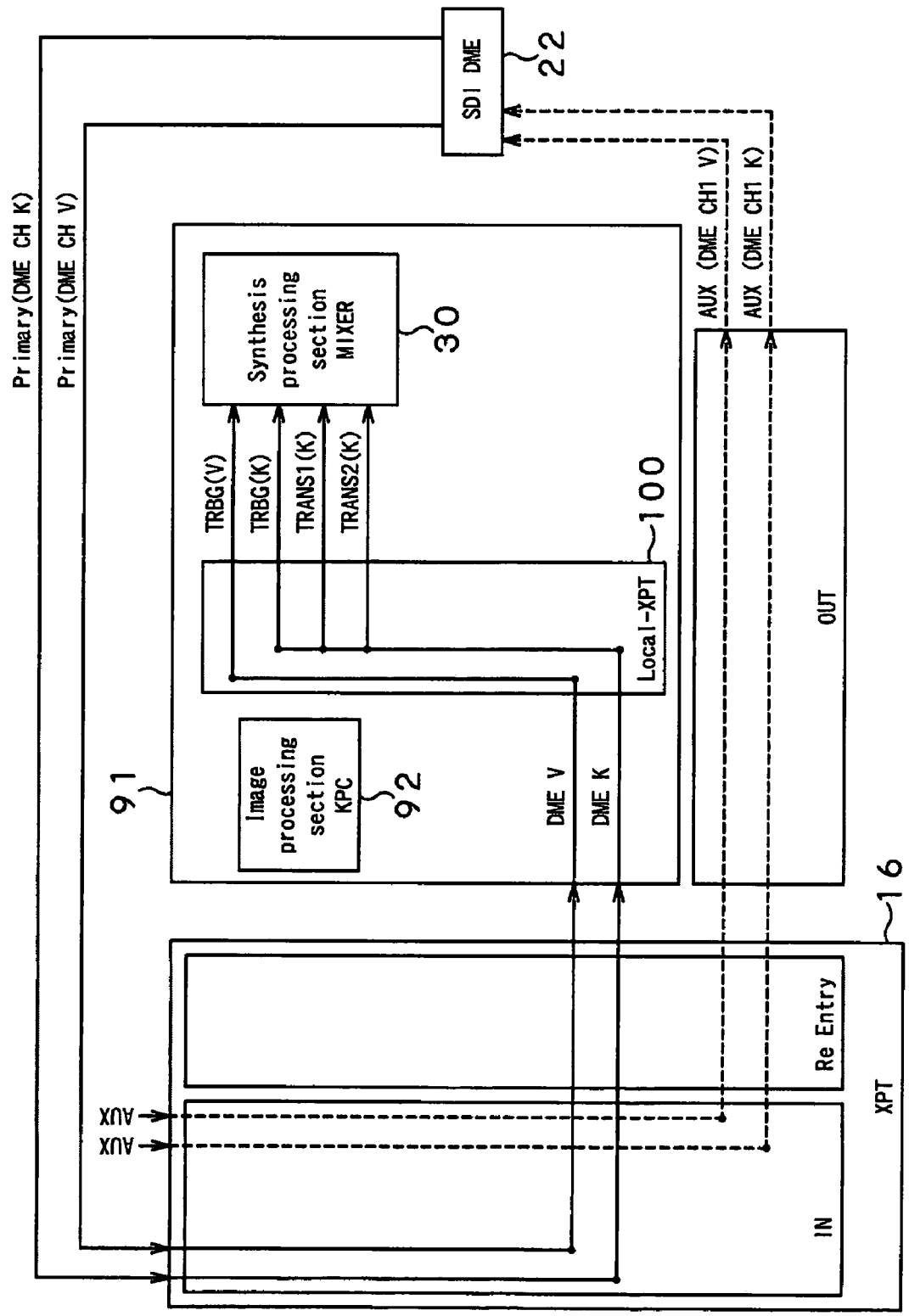
FIG. 17 is an operation example (DME Wipe 1ch) of the image switching system according to the third embodiment.

FIG. 17 is a view showing a signal flow when the synthesis processing section 30 uses, for image switching transition, one-channel image to which an external SDIDME (special effect apparatus) 22 has applied special effect to perform image switching processing. AUX (DME CH1 V) and AUX (DME CH1 K) from the auxiliary output selection bus 18 of the auxiliary output section 40 are supplied to the SDIDME 22 through the SDI auxiliary output line 21 according to a forward system (denoted by dotted lines). Primary (DME CH1 V) and Primary (DME CH1 K) which are paths to which the SDIDME 22 has applied special effect are supplied according to a return system (denoted by solid line), selected by the selection switches (cross point XPT) 16, and returned to the image synthesis/switching section 91. That is, the image synthesis/switching section 91 receives signals returning on DME V and DME K. These signals are selected by a local cross point 100 in the image synthesis/switching section 91 and input to the image processing section (MIXER) 30 as TRBG (V), TRBG (K), TRANS1 (K), and TRANS2 (K). The synthesis processing section 30 switches one-channel image to which the special effect has been applied like wipe processing. The bus configuration from the local cross point 100 to synthesis processing section 30 is set in the same manner as the dedicated I/F. On the return system, the returning signal is output, after being subjected to synthesis processing by the special effect apparatus, to Primary that has been set to the smallest channel among the DME CHs to be used.

Figure 18:
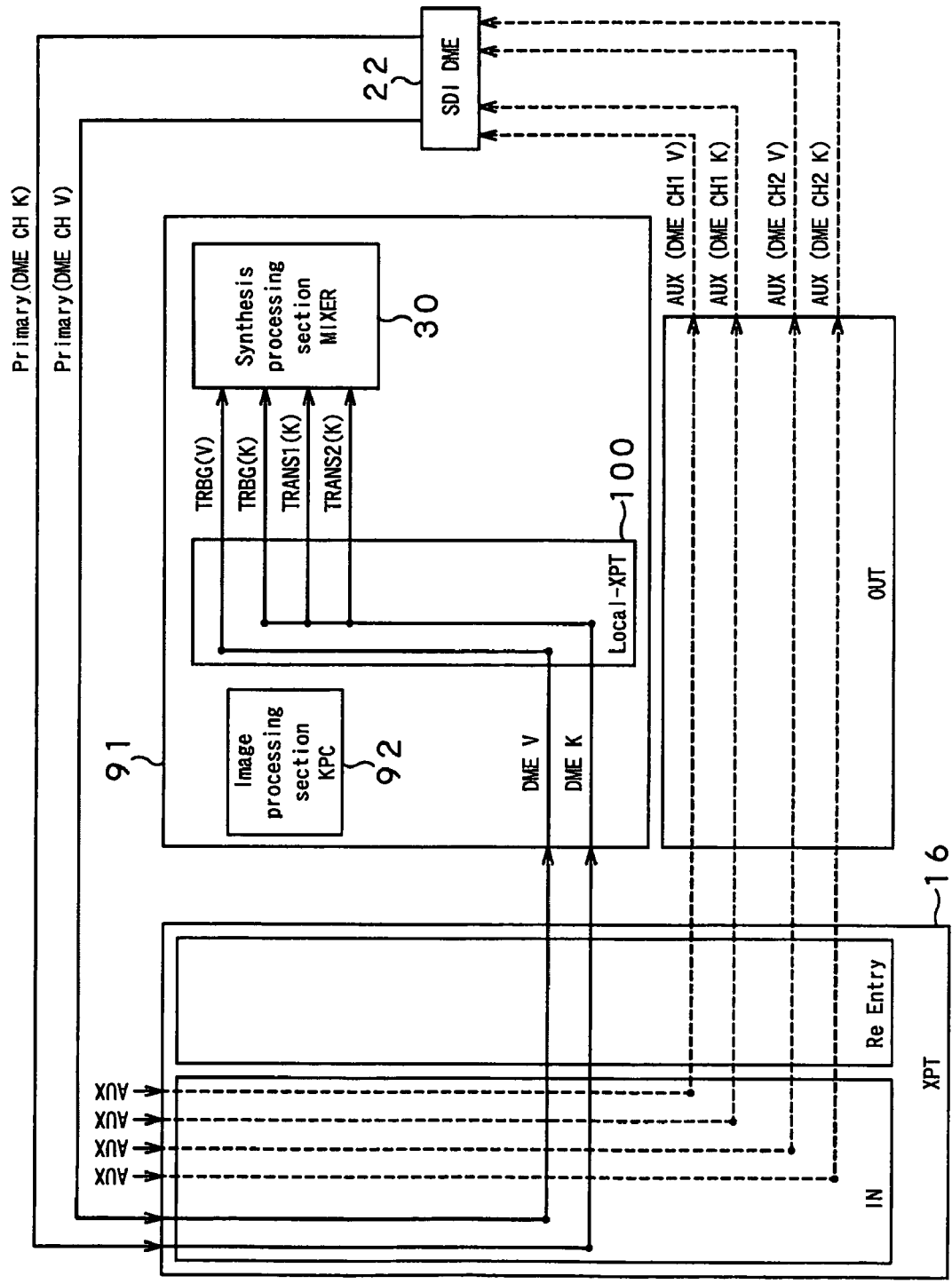
FIG. 18 is an operation example (DME Wipe 2ch) of the image switching system according to the third embodiment.

FIG. 18 is a view showing a signal flow when the synthesis processing section 30 uses, for image switching transition, two-channel image to which an external SDIDME (special effect apparatus) 22 has applied special effect to perform image switching processing. AUX (DME CH1 V), AUX (DME CH1 K), AUX (DME CH2 V), and AUX (DME CH2 K) from the auxiliary output selection bus 18 of the auxiliary output section 40 are supplied to the SDIDME 22 through the SDI auxiliary output line 21 according to a forward system (denoted by dotted lines). Primary (DME CH V) and Primary (DME CH K) which are paths to which the SDIDME 22 has applied special effect are supplied according to a return system (denoted by solid lines), selected by the selection switches (cross point XPT) 16, and returned to the image synthesis/switching section 91. That is, the image synthesis/switching section 91 receives signals returning on DME V and DME K. These signals are selected by a local cross point 100 in the image synthesis/switching section 91 and input to the image processing section (MIXER) 30 as TRBG (V), TRBG (K), TRANS1 (K), and TRANS2 (K). The synthesis processing section 30 switches two-channel image to which the special effect has been applied like wipe processing. The bus configuration from the local cross point 100 to synthesis processing section 30 is set in the same manner as the dedicated I/F. On the return system, the returning signal is output, after being subjected to synthesis processing by the special effect apparatus, to Primary that has been set to the smallest channel among the DME CHs to be used.

Figure 19:
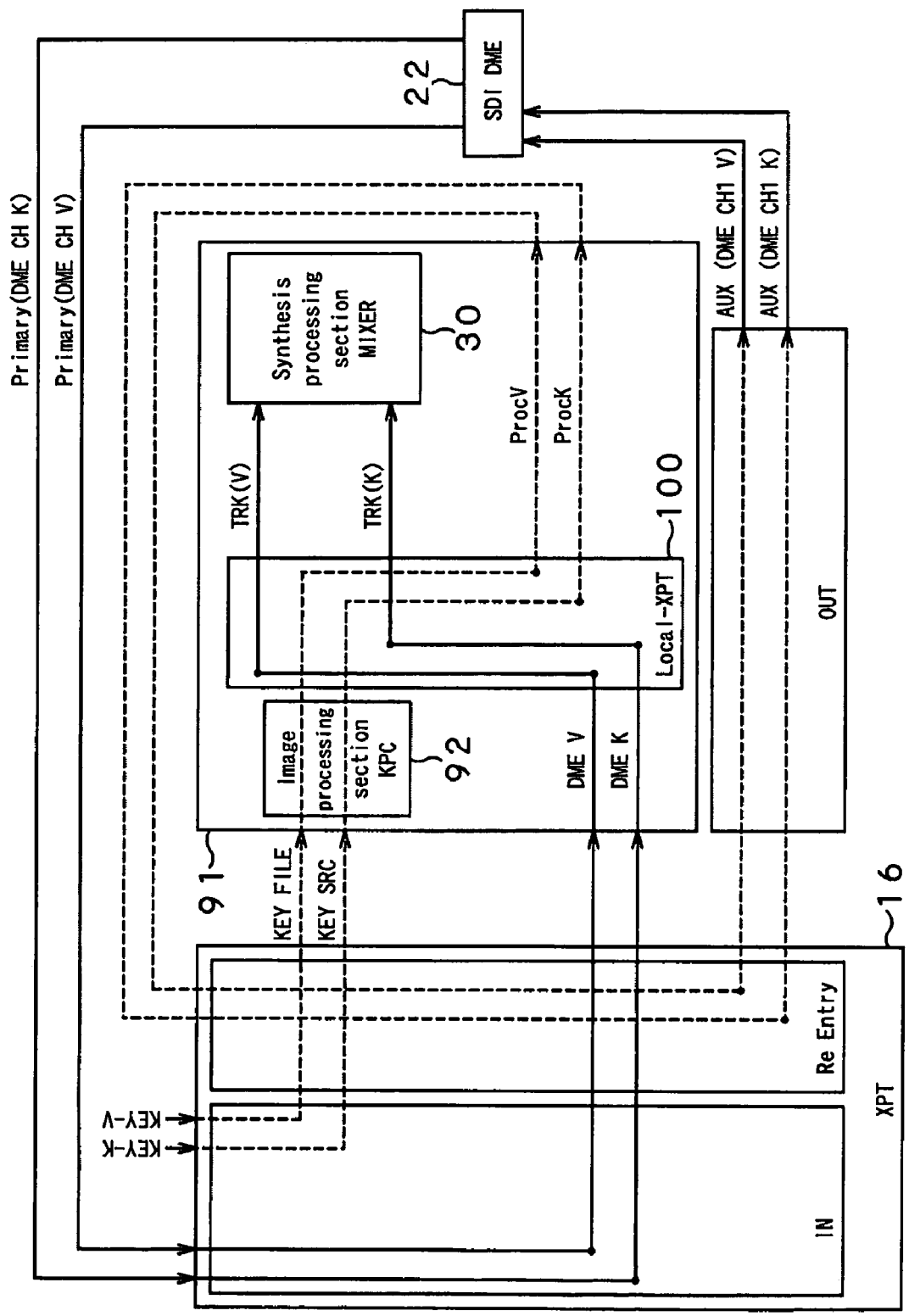
FIG. 19 is an operation example (KEY DME Wipe 1ch) of the image switching system according to the third embodiment.

FIG. 19 is a view showing a signal flow when the synthesis processing section 30 uses, for image switching transition, one-channel image having a key signal to which an external SDIDME (special effect apparatus) 22 has applied special effect to perform image switching processing. KEY signals KEY-V and KEY-K are supplied from the auxiliary output selection bus 18 of the auxiliary output section 40 and input to the image processing section 92 as KEY-FILL and KEY-SRC. Image signals ProcV and ProcK processed in the image processing section 92 are passed through the local cross point 100, reentered in the auxiliary output selection bus 18, and are supplied to the SDIDME 22 through the auxiliary output line according to a forward system (denoted by dotted lines) as AUX (DME CH1 V) and AUX (DME CH1 K). That is, the auxiliary output section 40 uses image signals ProcV and ProcK to perform reentry of ProcV and ProcK in a fixed manner in order to send an image of KEY to the SDI auxiliary output line. Primary (DME CH V) and Primary (DME CH K) to which the SDIDME 22 has applied special effect are supplied according to a return system (denoted by solid lines), reselected by the selection switches 16, and returned to the image synthesis/switching section 91. That is, the image synthesis/switching section 91 receives signals returning on DME V and DME K. These signals are selected by a local cross point 100 in the image synthesis/switching section 91 and input to the image processing section (MIXER) 30 as TRK (V) and TRK (K). The synthesis processing section 30 switches one-channel key image to which the special effect has been applied by wipe processing. The bus configuration from the local cross point 100 to synthesis processing section 30 is set in the same manner as the dedicated I/F. On the return system, the returning signal is output, after being subjected to synthesis processing by the special effect apparatus, to Primary that has been set to the smallest channel among the DME CHs to be used.

Figure 20:
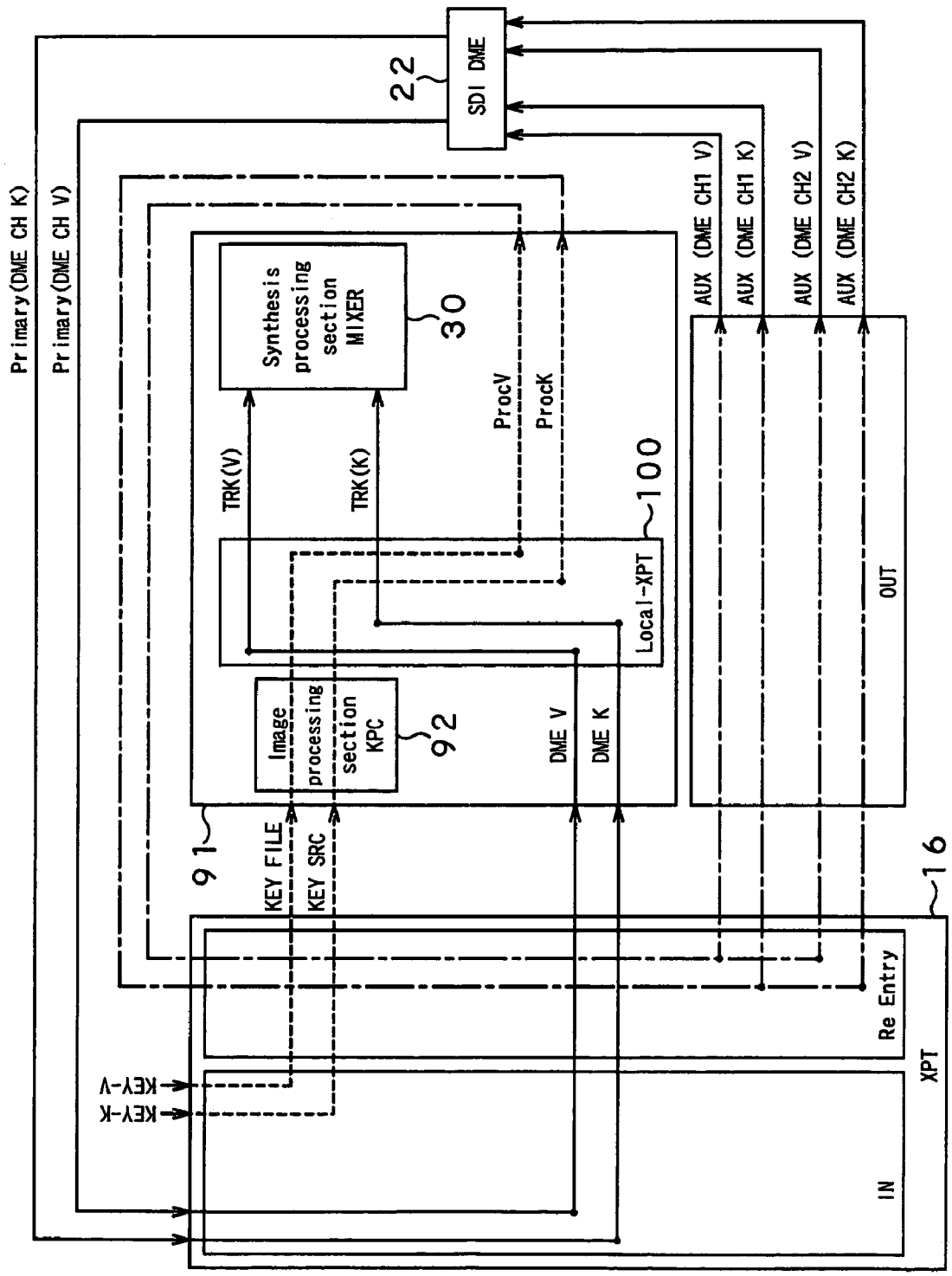
FIG. 20 is an operation example (KEY DME Wipe 2ch) of the image switching system according to the third embodiment.

FIG. 20 is a view showing a signal flow when the synthesis processing section 30 uses, for image switching transition, two-channel image having a key signal to which an external SDIDME (special effect apparatus) 22 has applied special effect to perform image switching processing. KEY signals KEY-V and KEY-K are supplied from the auxiliary output selection bus 18 of the auxiliary output section 40 and input to the image processing section 92 as KEY-FILL and KEY-SRC. Image signals ProcV and ProcK processed in the image processing section 92 are passed through the local cross point 100, reentered (denoted by dashed lines) in the auxiliary output selection bus 18, and are supplied to the SDIDME 22 through the auxiliary output line according to a forward system (denoted by dotted lines and the dashed lines) as AUX (DME CH1 V), AUX (DME CH1 K), AUX (DME CH2 V), and AUX (DME CH2 K). Note that the image on the second channel is made equal to the image on the first channel. That is, the auxiliary output section 40 uses image signals ProcV and ProcK to perform reentry (denoted by dashed lines) of ProcV and ProcK in a fixed manner in order to send (denoted by dotted lines) an image of KEY to the SDI auxiliary output line, thereby sending the same two channel-image to the SDIDME 22. Primary (DME CH V) and Primary (DME CH K) to which the SDIDME 22 has applied special effect are supplied according to a return system (denoted by solid line), reselected by the selection switches 16, and returned to the image synthesis/switching section 91. That is, the image synthesis/switching section 91 receives signals returning on DME V and DME K. These signals are selected by a local cross point 100 in the image synthesis/switching section 91 and input to the image processing section (MIXER) 30 as TRK (V) and TRK (K). The synthesis processing section 30 switches two-channel key image to which the special effect has been applied by wipe processing. The bus configuration from the local cross point 100 to synthesis processing section 30 is set in the same manner as the dedicated I/F. On the return system, the returning signal is output, after being subjected to synthesis processing by the special effect apparatus, to Primary that has been set to the smallest channel among the DME CHs to be used.

Figure 21:
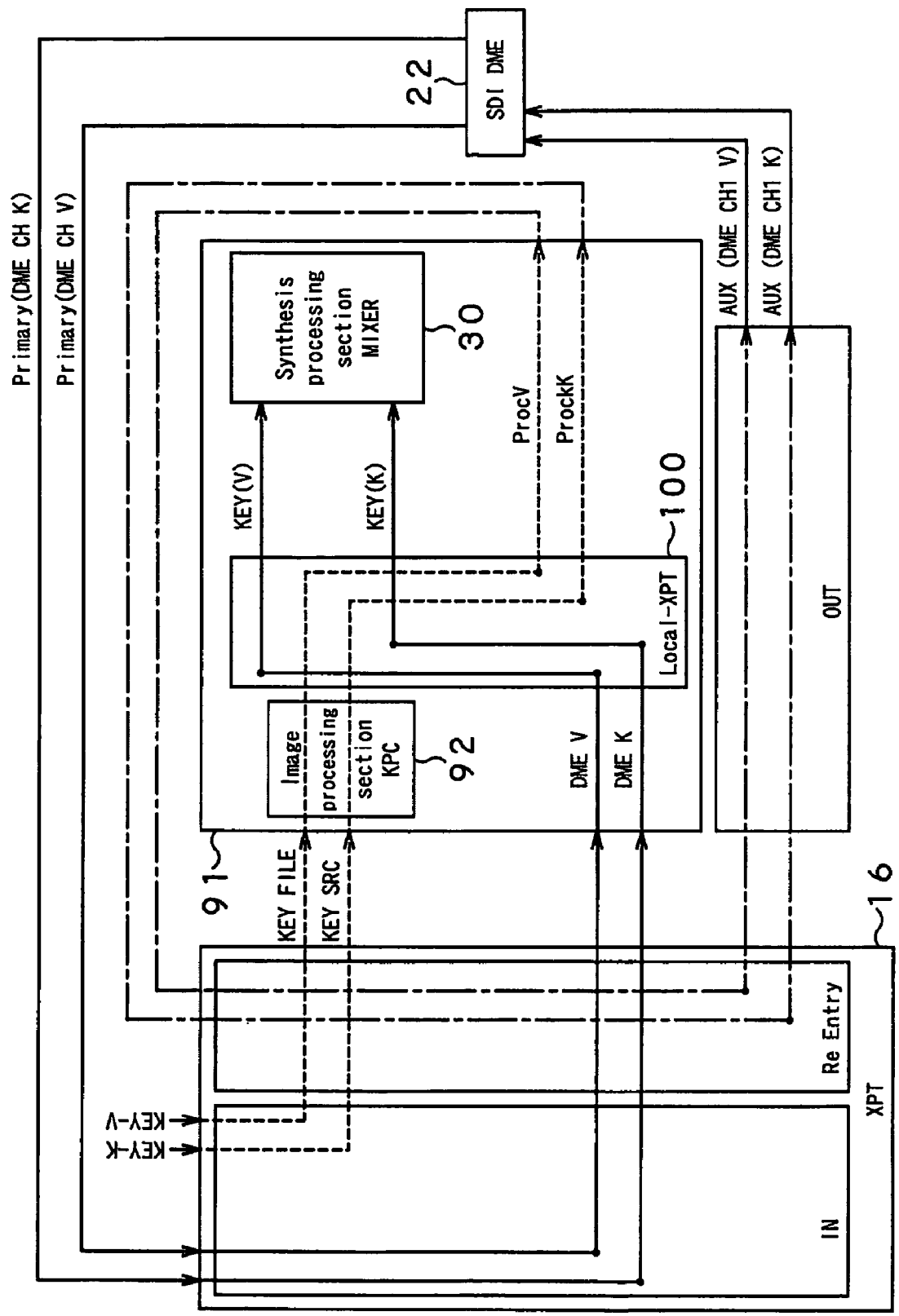
FIG. 21 is an operation example (External Proc. K 1ch) of the image switching system according to the third embodiment.

FIG. 21 is a view showing a signal flow when the synthesis processing section 30 uses, for image switching transition, one-channel image having an image processing signal Proc. K to which an external SDIDME (special effect apparatus) 22 has applied special effect to perform image switching processing. KEY signals KEY-V and KEY-K are supplied from the auxiliary output selection bus 18 of the auxiliary output section 40 and input to the image processing section 92 as KEY-FILL and KEY-SRC. Image signals ProcV and ProcK processed in the image processing section 92 are passed through the local cross point 100, reentered (denoted by dashed lines) in the auxiliary output selection bus 18, and are supplied to the SDIDME 22 through the auxiliary output line according to a forward system (denoted by dotted lines and the dashed lines) as AUX (DME CH1 V) and AUX (DME CH1 K). That is, the auxiliary output section 40 uses image signals ProcV and ProcK to perform reentry (denoted by dashed lines) of ProcV and ProcK in a fixed manner in order to send (denoted by dotted lines) Prok.K to the SDI auxiliary output line. Primary (DME CH V) and Primary (DME CH K) to which the SDIDME 22 has applied special effect are supplied according to a return system (denoted by solid line), reselected by the selection switches 16, and returned to the image synthesis/switching section 91. That is, the image synthesis/switching section 91 receives signals returning on DME V and DME K. These signals are selected by a local cross point 100 in the image synthesis/switching section 91 and input to the image processing section (MIXER) 30 as KEY (V) and KEY (K). The synthesis processing section 30 uses KEY (K) of one channel image to which the special effect has been applied for synthesis processing, thereby switching the output image. The bus configuration from the local cross point 100 to synthesis processing section 30 is set in the same manner as the dedicated I/F. On the return system, the returning signal is output, after being subjected to synthesis processing by the special effect apparatus, to Primary that has been set to the smallest channel among the DME CHs to be used.

Figure 22:
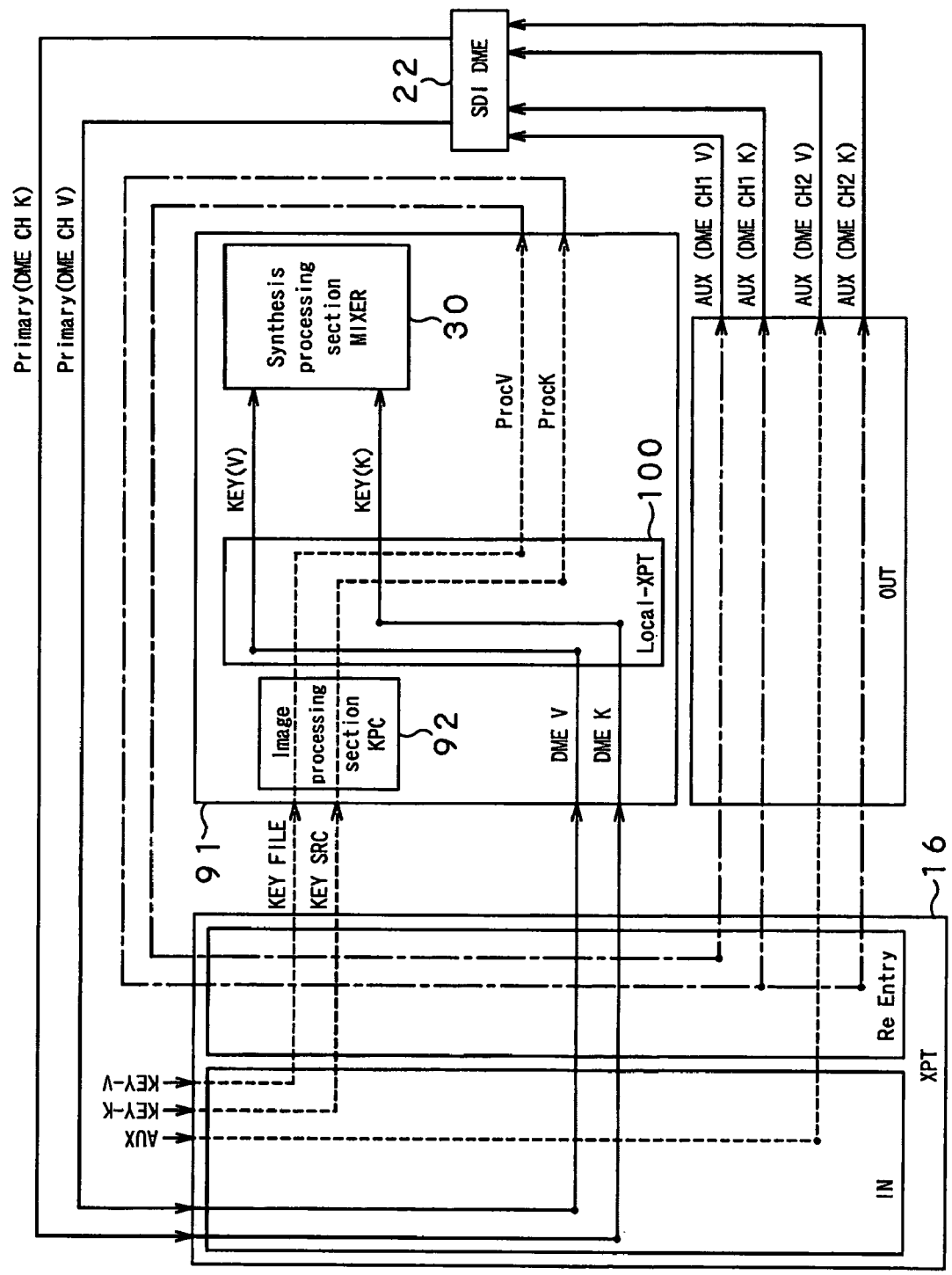
FIG. 22 is an operation example (External Proc. K 2ch) of the image switching system according to the third embodiment.

FIG. 22 is a view showing a signal flow when the synthesis processing section 30 uses, for image switching transition, two-channel image having an image processing signal Proc. K to which an external SDIDME (special effect apparatus) 22 has applied special effect to perform image switching processing. KEY signals KEY-V and KEY-K are supplied from the auxiliary output selection bus 18 of the auxiliary output section 40 and input to the image processing section 92 as KEY-FILL and KEY-SRC. Image signals ProcV and ProcK processed in the image processing section 92 are passed through the local cross point 100, reentered (denoted by dashed lines) in the auxiliary output selection bus 18, and are supplied to the SDIDME 22 through the auxiliary output line according to a forward system (denoted by dotted lines and the dashed lines) as AUX (DME CH1 V), AUX (DME CH1 K), AUX (DME CH2 V), and AUX (DME CH2 K). Note that an image selected by AUX is used as V of the second channel image and an image selected by the first channel is used as K. That is, the auxiliary output section 40 uses image signals ProcV and ProcK to perform reentry of ProcV and ProcK in a fixed manner in order to send an image of KEY to AUX. Primary (DME CH V) and Primary (DME CH K) to which the SDIDME 22 has applied special effect are supplied according to a return system (denoted by solid line), reselected by the selection switches 16, and returned to the image synthesis/switching section 91. That is, the image synthesis/switching section 91 receives signals returning on DME V and DME K. These signals are selected by a local cross point 100 in the image synthesis/switching section 91 and input to the image processing section (MIXER) 30 as KEY (V) and KEY (K). The synthesis processing section 30 uses KEY (K) of two-channel image to which the special effect has been applied for synthesis processing, thereby switching the output image. The bus configuration from the local cross point 100 to synthesis processing section 30 is set in the same manner as the dedicated I/F. On the return system, the returning signal is output, after being subjected to synthesis processing by the special effect apparatus, to Primary that has been set to the smallest channel among the DME CHs to be used.

In the image switching systems 1, 5, and 9 according to the embodiments 1 to 3, some type of a special effect apparatus requires delay corresponding to one field or one frame between input of an image and output of the image after application of special effect.

When such a special effect apparatus is utilized by the above image switching apparatuses, only the control for the switching of the path of the image to be sent to the special effect apparatus is performed one field or one frame earlier than the control for the switching of other parts in accordance with the delay. The other parts are allowed to operate one field or one frame after, at the timing when a desired image to which special effect has been applied is returned from the special effect apparatus. Such control can match the image switching timing between the image going through the special effect apparatus and the image that does not go through the special effect apparatus. It is possible to adopt the delay control in the embodiments of the present invention.

Further, it is possible to change the delay amount depending on the type of the special effect apparatus. In this case, information related to the delay amount is stored in the type storage section, the type storage section is referred to, and the operation of the selection switches for the buses other than that for the source bus is delayed by a predetermined amount in accordance with the information.

Although two types of special effect apparatuses are used in the above descriptions, the present invention can be applied to the configuration in which three types of special effect apparatuses having different interfaces among them. Further, the numbers of image synthesis/switching sections, special effect apparatuses, and input buses are not especially limited.

Further, in the above embodiments, the image switching apparatus is constituted by hardware, as shown in FIG. 3. Alternatively, however, the image switching apparatus can be realized by storing a program, which is based on an image switching method according to the present invention in a CD-ROM, HDD, other disc recording medium, semiconductor recording medium, or the like, and by allowing a computer such as a work station, personal computer or the like to execute the program.

The image switching method according to the present invention will be described below. The image switching method uses two types or more of special effect apparatuses having different I/O interfaces from each other to apply special effect processing to a plurality of input images and further uses an image synthesis step to apply switching processing involving image synthesis processing, and the method further uses a type storage section which stores settings indicating whether to use either a first path which is based on a combination of a first image output interface for a first special effect apparatus and first image input interface for the first special effect apparatus or a second path which is based on a combination of a second image output interface for a second special effect apparatus to be connected to the image synthesis step and second image input interface for the second special effect apparatus. The image switching method comprises a "routing through special effect apparatus" instruction step of inputting an instruction that causes an image to go through the special effect apparatus; an image synthesis/switching step including a selection switching step of performing switching processing for the image selected from a plurality of externally input images and the image from the first or second image input interface and the image synthesis step that performs synthesis processing; a synthesis/switching operation input step of performing input operation to select the image to be input to the image synthesis/switching step; and an assignment management step of referring to the type storage section in response to an instruction from the "routing through special effect apparatus" instruction step, and outputting the image in the image synthesis/switching step to the first image output interface as well as acquiring the image from the first image input interface to input the acquired image to the image synthesis/switching step when the setting is the first path, and outputting the image in the image synthesis/switching step to the second image output interface as well as acquiring the image from the second image input interface to input the acquired image to the image synthesis/switching step when the setting is the second path, and referring to the type storage section in response to an input image selection instruction from the synthesis/switching operation input step and selecting an image to be directed to the first image output interface when the setting is the first path and selecting an image to be directed to the second image output interface when the setting is the second path.

Figure 1:
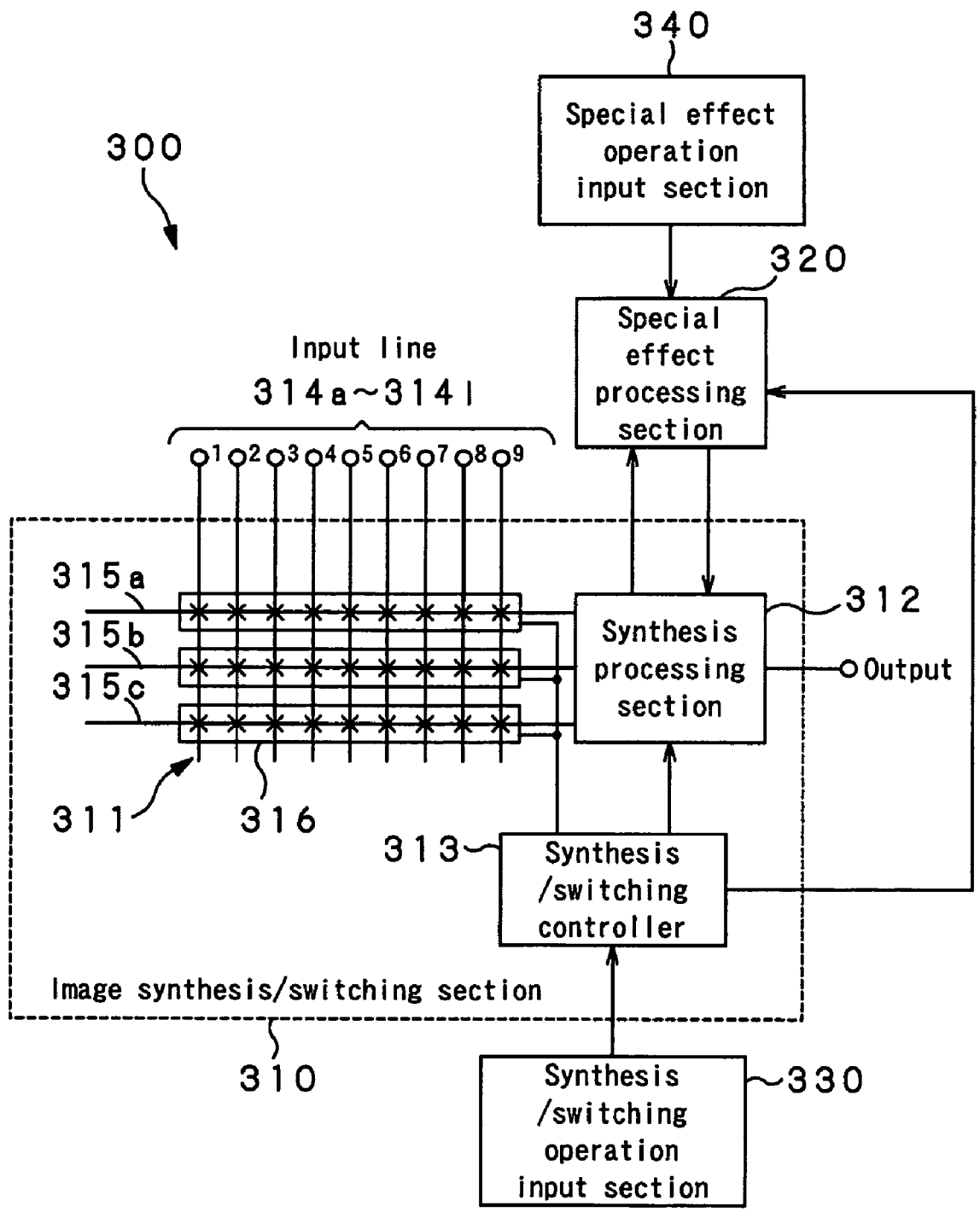
FIG. 1 is a view showing a configuration of a conventional image switching apparatus.
Figure 2:
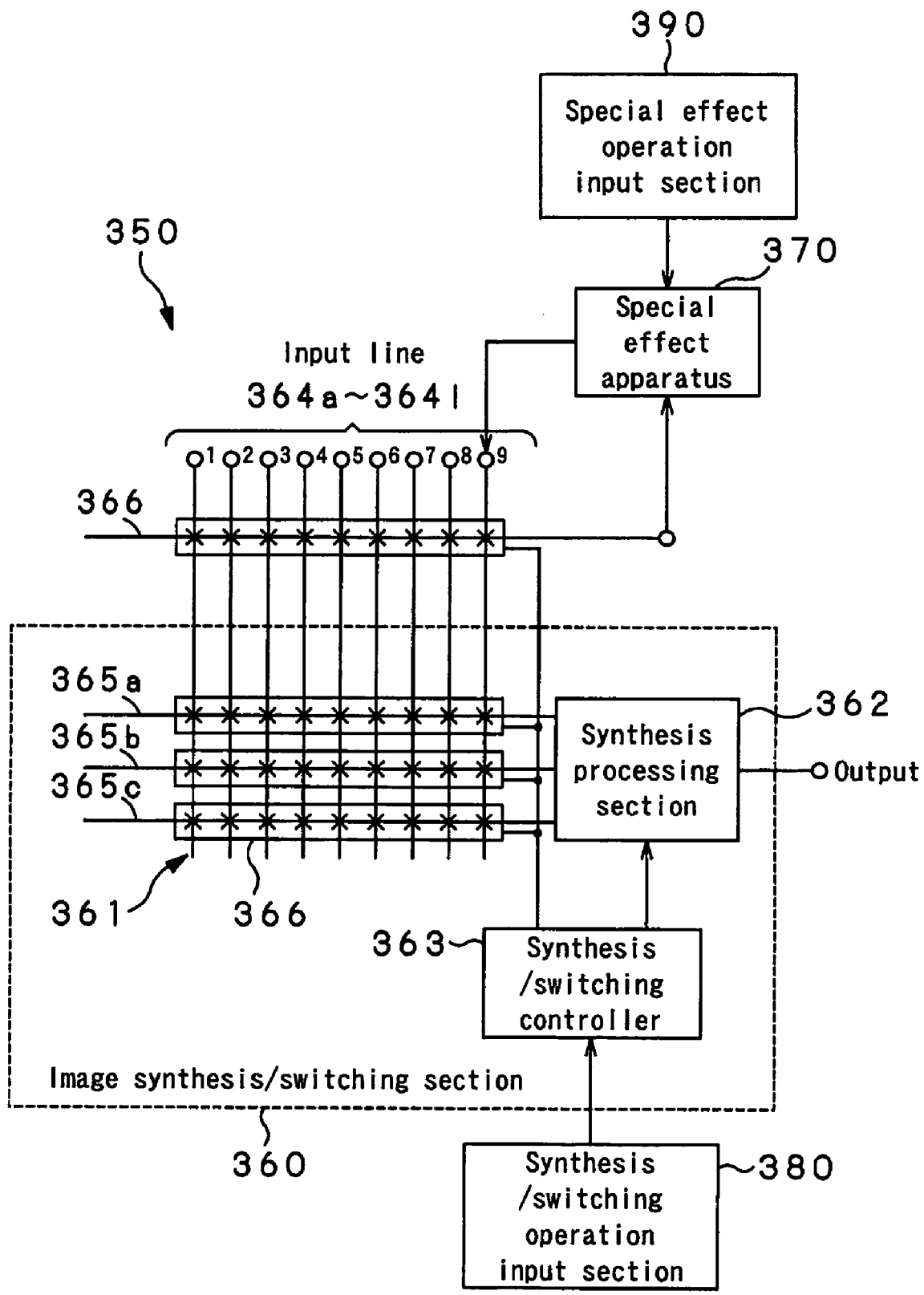
FIG. 2 is a view showing a configuration of another conventional image switching apparatus.

The above image switching method can be realized by a program that executes the processing procedures shown in FIGS. 5, 6, 11, 13, 15, and 16. The program can be stored in the abovementioned various recording medium. When the recording medium storing the program is attached to a computer, the computer uses a CPU to sequentially fetch the steps of the program in a work area (RAM, etc.) through a bus and execute it, thereby allowing the computer to function as an image switching apparatus whose hardware configuration is shown in FIG. 1 and the like.

It should be understood by those skilled in the art that various modifications, combinations, sub-combinations and alternations may occur depending on design requirements and other factors insofar as they are within the scope of the appended claims or the equivalents thereof.

What is claimed is:

1. An image switching apparatus which uses two types or more of special effect apparatuses having different I/O interfaces from each other to apply special effect processing to a plurality of input images and further uses image synthesis means to perform switching processing involving image synthesis processing, comprising:

a first image output interface for a first special effect apparatus to be connected to the image synthesis means;

a first image input interface for the first special effect apparatus;

a second image output interface for a second special effect apparatus to be connected to the image synthesis means;

a second image input interface for the second special effect apparatus;

a type storage section which stores settings indicating whether to use either a first path which is based on a combination of the first image output interface and first image input interface or a second path which is based on a combination of the second image output interface and second image input interface;

routing instruction means for inputting an instruction that causes an image to go through the special effect apparatus;

one or more image synthesis/switching sections including selection switches for an operator to perform switching processing between the image selected from a plurality of externally input images and the first or second image input interface and the image synthesis means which performs synthesis processing;

a synthesis/switching operation input section for the operator to perform input operation to select the image to be input to the image synthesis/switching section; and an assignment management section which refers to the type storage section in response to an instruction from the routing instruction means and outputs the image in the image synthesis/switching section to the first image output interface as well as acquires the image from the first image input interface to input the acquired image to the image synthesis/switching section when the setting is the first path, and outputs the image in the image synthesis/switching section to the second image output interface as well as acquires the image from the second image input interface to input the acquired image to the image synthesis/switching section when the setting is the second path, and refers to the type storage section in response to an input image selection instruction from the synthesis/switching operation input section and selects an image to be directed to the first image output interface when the setting is the first path, and selects an image to be directed to the second image output interface when the setting is the second path.

2. The image switching apparatus according to claim 1, wherein the first image output interface and first image input interface are serial digital interface signal transmission paths, and the second image output interface and second image input interface are parallel transmission paths using three or more conducting wires.

3. The image switching apparatus according to claim 1, wherein, when the setting in the type storage section is made such that first image output interface is not selected, the first image output interface is used as an interface for supplying the output image of the image switching apparatus to an external device.

4. The image switching apparatus according to claim 1, further comprising a connection switching section connected to the second image output interface and second image input interface to allow a plurality of special effect apparatuses to be selectively connected to the image switching apparatus.

5. The image switching apparatus according to claim 1, wherein the apparatus refers to the type storage section to determine a delay for delaying, relative to the timing of switching the image to be sent to the image output interface, the timing of other operations.

6. The image switching apparatus according to claim 1, wherein the image synthesis/switching section comprises an image processing section.

7. An image switching method which uses two types or more of special effect apparatuses having different I/O interfaces from each other to apply special effect processing to a plurality of input images and further uses image synthesis to apply switching processing involving image synthesis processing, wherein the method further uses a type storage section which stores settings indicating whether to use either a first path which is based on a combination of a first image output interface for a first special effect apparatus and first image input interface for the first special effect apparatus or a second path which is based on a combination of a second image output interface for a second special effect apparatus to be connected to the image synthesis step and second image input interface for the second special effect apparatus, the method comprising:

inputting an instruction that causes an image to go through the special effect apparatus;

performing switching processing for the image selected from a plurality of externally input images and the image from the first or second image input interface and the image synthesis that performs synthesis processing;

performing input operation to select the image to be input to the performing switching processing; and referring to the type storage section in response to an instruction from the inputting and outputting the image in the performing switching processing to the first image output interface as well as acquiring the image from the first image input interface to input the acquired image to the performing switching processing when the setting is the first path, and outputting the image in the performing switching processing to the second image output interface as well as acquiring the image from the second image input interface to input the acquired image to the performing switching processing when the setting is the second path, and referring to the type storage section in response to an input image selection instruction from the performing input operation and selecting an image to be directed to the first image output interface when the setting is the first path, and selecting an image to be directed to the second image output interface when the setting is the second path.

8. A program recording medium storing an image switching program which when executed by a processor causes the processor to perform a method which uses two types or more of special effect apparatuses having different I/O interfaces from each other to apply special effect processing to a plurality of input images and further uses image synthesis to apply switching processing involving image synthesis processing, wherein the method further uses a type storage section which stores settings indicating whether to use either a first path which is based on a combination of a first image output interface for a first special effect apparatus to be connected to the image synthesis means and first image input interface for the first special effect apparatus or a second path which is based on a combination of a second image output interface for a second special effect apparatus to be connected to the image synthesis and second image input interface for the second special effect apparatus, the method comprising:

inputting an instruction that causes an image to go through the special effect apparatus;

performing switching processing for the image selected from a plurality of externally input images and the image from the first or second image input interface and the image synthesis that performs synthesis processing;

performing input operation to select the image to be input to the performing switching processing; and referring to the type storage section in response to an instruction from the inputting and outputting the image in the performing switching processing to the first image output interface as well as acquiring the image from the first image input interface to input the acquired image to the performing switching processing when the setting is the first path, outputting the image in the performing switching processing to the second image output interface as well as acquiring the image from the second image input interface to input the acquired image to the performing switching processing when the setting is the second path, and referring to the type storage section in response to an input image selection instruction from the performing input operation and selecting an image to be directed to the first image output interface when the setting is the first path, and selecting an image to be directed to the second image output interface when the setting is the second path.

9. An image switching apparatus which uses two types or more of special effect apparatuses having different I/O interfaces from each other to apply special effect processing to a plurality of input images and further uses an image synthesis section to perform switching processing involving image synthesis processing, comprising:

a first image output interface for a first special effect apparatus to be connected to the image synthesis section;
a first image input interface for the first special effect apparatus;
a second image output interface for a second special effect apparatus to be connected to the image synthesis section;
a second image input interface for the second special effect apparatus;
a type storage section which stores settings indicating whether to use either a first path which is based on a combination of the first image output interface and first image input interface or a second path which is based on a combination of the second image output interface and second image input interface;
a routing instruction section for inputting an instruction that causes an image to go through the special effect apparatus;
one or more image synthesis/switching section including selection switches for an operator to perform switching processing between the image selected from a plurality of externally input images and the first or second image input interface and the image synthesis section which performs synthesis processing;
a synthesis/switching operation input section for the operator to perform input operation to select the image to be input to the image synthesis/switching section; and
an assignment management section which refers to the type storage section in response to an instruction from the routing instruction section and outputs the image in the image synthesis/switching section to the first image output interface as well as acquires the image from the first image input interface to input the acquired image to the image synthesis/switching section when the setting is the first path, and outputs the image in the image synthesis/switching section to the second image output interface as well as acquires the image from the second image input interface to input the acquired image to the image synthesis/switching section when the setting is the second path, and
refers to the type storage section in response to an input image selection instruction from the synthesis/switching operation input section and selects an image to be directed to the first image output interface when the setting is the first path, and selects an image to be directed to the second image output interface when the setting is the second path.

10. An image switching apparatus which uses two types or more of external special effect apparatuses external to the image switching apparatus having different interfaces, comprising:
a type storage section which stores a plurality of types corresponding to the two types or more of external special effect apparatuses and the different interfaces;
a judging section for judging which external special effect apparatus is connected and which interface is used; and
an assignment management section which manages a predetermined path based on the type determined by referring to the type storage section according to the judging of the judging section.

11. An image switching method which uses two types or more of external special effect apparatuses having different interfaces, comprising:
storing in a type storage section a plurality of types corresponding to the two types or more of external special effect apparatuses and the interfaces;
judging which external special effect apparatus is connected and which interface is used; and
managing a predetermined path based on the type determined by referring to the type storage section according to the judging.

12. An image switching apparatus which uses two types or more of external special effect apparatuses external to the image switching apparatus having different interfaces, comprising:
a type memory configured to store a plurality of types corresponding to the two types or more of external special effect apparatuses and the interfaces;
a circuit configured to judge which external special effect apparatus is connected and which interface is used; and
a controller configured to manage a predetermined path based on the type, wherein the type is determined by referring to the type storage section according to the judging of the circuit.

13. An image switching apparatus which uses two types or more of special effect apparatuses having different I/O interfaces from each other to apply special effect processing to a plurality of input images and further uses an image synthesizer to perform switching processing involving image synthesis processing, comprising:
a first output interface configured to output images to a first special effect apparatus to be connected to the image synthesizer;
a first input interface configured to input images to the first special effect apparatus;
a second output interface configured to output images to a second special effect apparatus to be connected to the image synthesis means;
a second input interface configured to input images to the second special effect apparatus;
a type storage memory configured to store settings indicating whether to use either a first path which is based on a combination of the first image output interface and first input interface or a second path which is based on a combination of the second output interface and second input interface;
a router configured to input an instruction that causes an image to go through the special effect apparatus;
one or more image synthesizers configured to perform synthesis processing, the one or more image synthesizers including selection switches for an operator to perform switching processing between the image selected from a plurality of externally input images and the first or second input interface;
a synthesizer input configured to enable the operator to perform input operation to select the image to be input to the image synthesizer; and
an assignment manager configured to refer to the type storage section in response to an instruction from the router and to output the image in the image synthesizer to the first output interface as well as to acquire the image from the first input interface to input the acquired image to the image synthesizer when the setting is the first path, and to output the image in the image synthesizer to the second output interface as well as to acquire the image from the second input interface to input the acquired image to the image synthesizer when the setting is the second path, and
to refer to the type storage section in response to an input image selection instruction from the synthesizer input and to select an image to be directed to the first output interface when the setting is the first path, and to select an image to be directed to the second output interface when the setting is the second path.

* * * * *